United States Patent [19]

Ohta et al.

[11] Patent Number: 4,915,477

[45] Date of Patent: Apr. 10, 1990

[54] METHOD FOR DRIVING AN ELECTRO-OPTICAL DEVICE WHEREIN ERASING DATA STORED IN EACH PIXEL BY PROVIDING EACH SCAN LINE AND DATA LINE WITH AN ERASING SIGNAL

[75] Inventors: Tadashi Ohta; Jun Sugiyama, both of Suwa, Japan

[73] Assignee: Seiko Epson Corporation, Tokyo, Japan

[21] Appl. No.: 255,296

[22] Filed: Oct. 11, 1988

[30] Foreign Application Priority Data

Oct. 12, 1987 [JP] Japan ................................ 62-256911
Oct. 14, 1987 [JP] Japan ................................ 62-258845
Oct. 22, 1987 [JP] Japan ................................ 62-266883

[51] Int. Cl.⁴ .......................... G02F 1/13; G09G 3/36

[52] U.S. Cl. ..................................... 350/333; 350/332; 340/784

[58] Field of Search ..................... 350/333, 332, 350 S; 340/784, 805, 713

[56] References Cited

U.S. PATENT DOCUMENTS 4,638,310 1/1987 Ayliffe ................................ 340/805
4,705,345 11/1987 Ayliffe et al. .................... 340/784 X
4,728,947 3/1988 Ayliffe et al. ........................ 340/805
4,793,693 12/1988 Shimoda et al. ................ 350/333 X
4,800,382 1/1989 Okada et al. ........................ 340/784
4,834,510 5/1989 Fujita ............................. 350/333 X
4,836,656 6/1989 Mouri et al. ......................... 350/333

OTHER PUBLICATIONS

Philips Research Laboratories of Eindhoven, The Netherlands, J. Appl. Phys., 59(9), May 1, 1986 at pp. 3087–3090.

*Primary Examiner*—Stanley D. Miller
*Assistant Examiner*—Huy K. Mai
*Attorney, Agent, or Firm*—Blum Kaplan

[57] ABSTRACT

A method of driving an electro-optical device having a plurality of scan lines, data lines and pixels in which data written into and stored within the plurality of pixels is erased from the pixels sequentially rather than at the same time. A plurality of pulses supplied on the scan and data lines during the erasing period produces an erasing period for each scan line which is substantially the same. The effective voltage value of signal waveforms during the erasing period is less than the absolute magnitude of a holding signal waveform which maintains the data in the pixels until the erasing period begins.

59 Claims, 13 Drawing Sheets

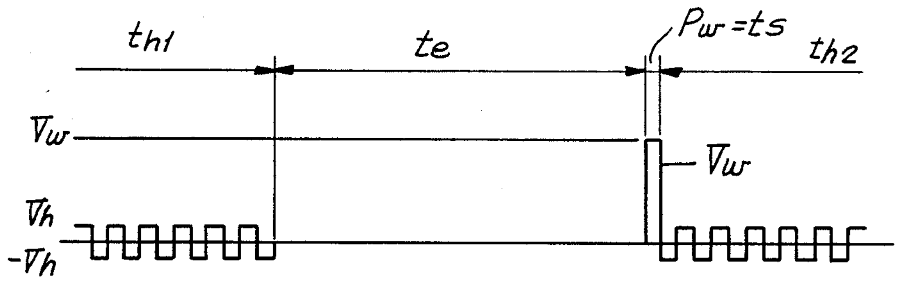
FIG. 3
PRIOR ART
FIG. 4
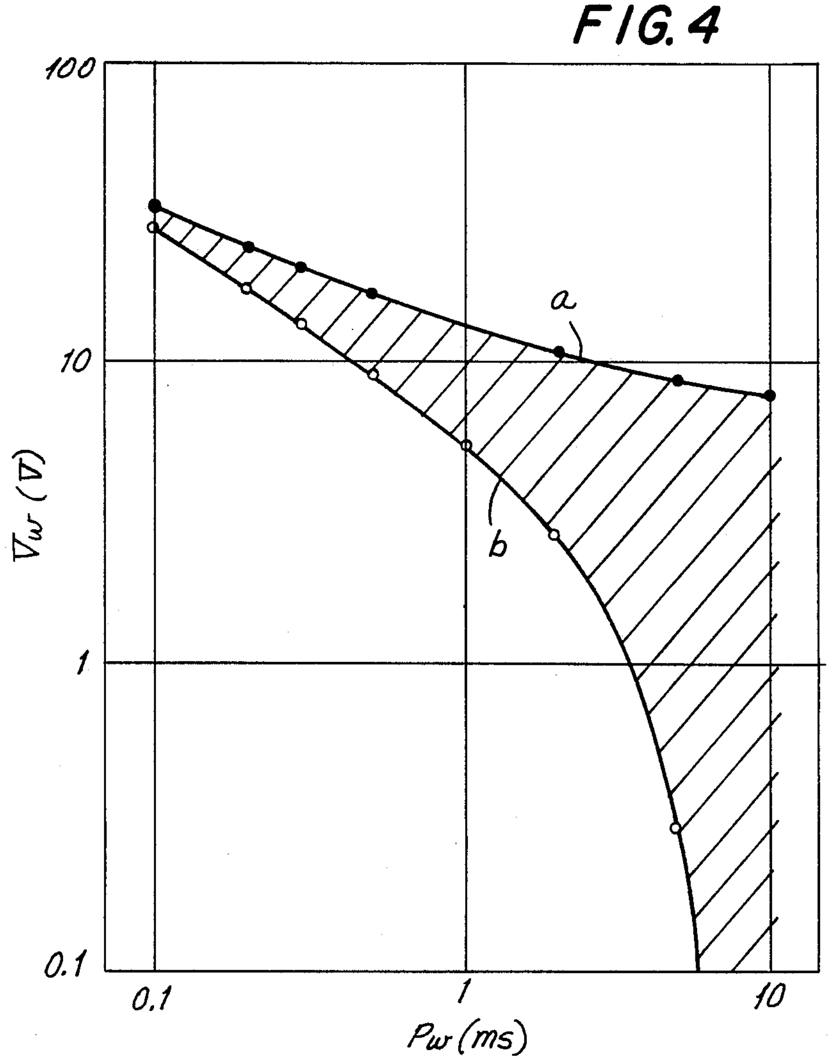

FIG. 6(a)
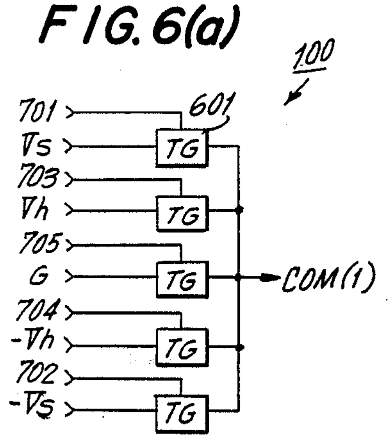
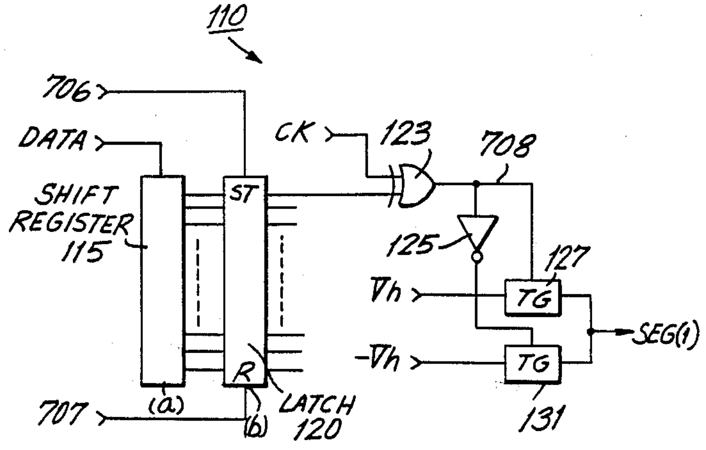
FIG. 6(b)
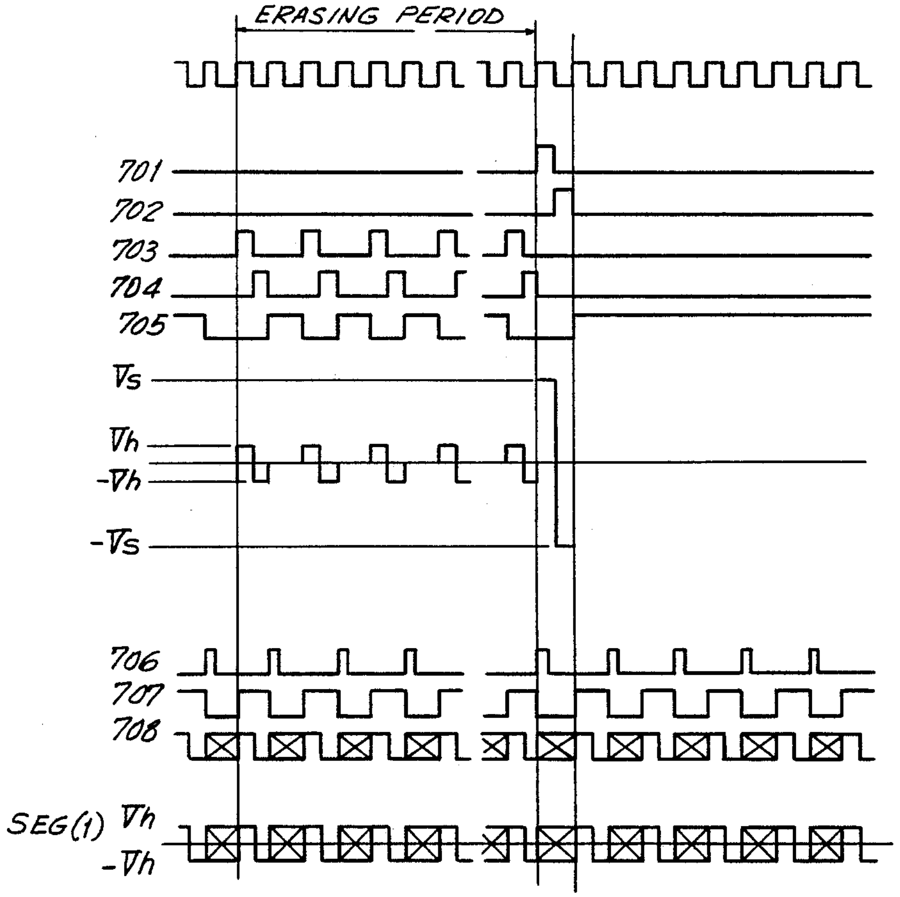
FIG. 7

ERASING PERIOD te2
HOLDING PERIOD th1
te1
ts
HOLDING PERIOD th2

Vh
-Vh

Ve1
Vh
-Vh
-Ve1
VON
-VON

Ver
Vh
-Vh
VON

Ve1
Vh
-Vh
-Ve1
VON
-VON

Ve1
Vh
-Vh
-Ve1
VON
-VON

Vh
-Vh

FIG. 17(a)
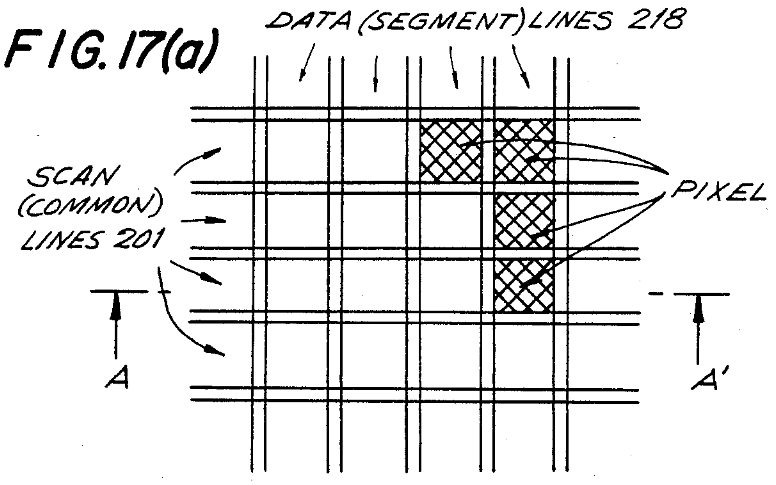
FIG. 17(b)
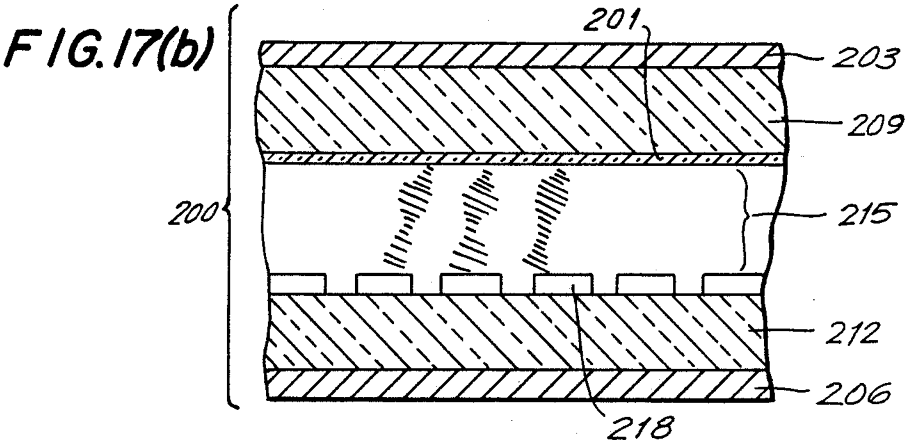
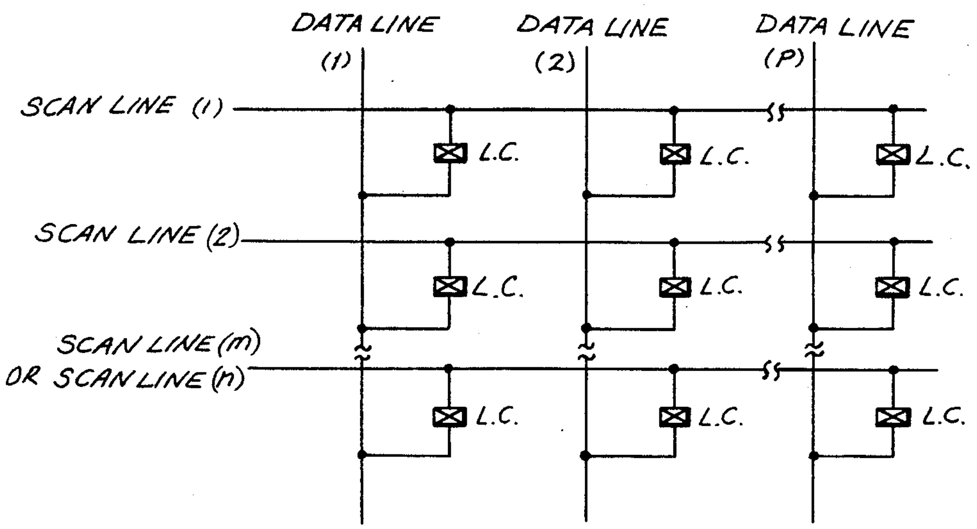
FIG. 18

METHOD FOR DRIVING AN ELECTRO-OPTICAL DEVICE WHEREIN ERASING DATA STORED IN EACH PIXEL BY PROVIDING EACH SCAN LINE AND DATA LINE WITH AN ERASING SIGNAL

BACKGROUND OF THE INVENTION

This invention relates generally to a method of driving an electro-optical device, and more particularly to a method of driving a display unit or a transmitting light control unit or the like using a liquid crystal panel which includes a hysteresis-type super-twisted nematic mode of operation.

A wide variety of electro-optical devices are presently available. One type of electro-optical device includes a liquid crystal panel of relatively simple construction which is commonly used as a display unit, a photoshutter or the like due to its relatively small size, light weight and minimal electric power consumption requirements.

Liquid crystal electro-optical devices having large display capacities and areas are far simpler to manufacture when using simple rather than an active matrixes. Nevertheless, conventional liquid crystal electro-optical devices which have large display capacities using simple-matrices are difficult to manufacture due to their optical response characteristics. More particularly, the display quality and/or response velocity deteriorates due to a lack of desirable electro-optical characteristics within the liquid crystal. Such deterioration has been observed in an electro-optical device using a twisted nematic liquid crystal having a 1/200 duty as well as a super twisted nematic liquid crystal (i.e. a STN/SBE mode) where high performance is attained by providing large twist angles and having a 1/400 or greater duty.

In an attempt to overcome the aforementioned deterioration in display quality and/or in response velocity, a method in an article by Philips Research Laboratories of Eindhoven, The Netherlands appearing in the J. Appl. Phys. 59(9), May 1, 1986 at pages 3087–3090, published by the American Institute of Physics, proposes application of a bistable voltage for storing data within a liquid crystal whose orientation is controlled. This method takes advantage of the fact that the applied voltage and transmissivity or reflectivity are combined to cause a hysteresis effect in a liquid crystal whose angle of twist exceeds 90° depending on the material of the liquid crystal. These hysteresis effects are shown in FIGS. 2(*a*) and 2(*b*). The information selectively written during the writing process is held in an associated pixel by providing a holding voltage to a corresponding scan line of the matrix. The value of the holding voltage is set to fall within the hysteresis loop of the voltage-transmissivity or voltage-reflectivity curves as shown in FIGS. 2(*a*) and 2(*b*). The display mode associated with the voltage-transmissivity or voltage-reflectivity curve is hereinafter referred to as a hysteresis-type super-twisted nematic mode (HTN mode).

The writing and erasing processes of the Philips system occur over approximately 0.2 milliseconds and 50 milliseconds, respectively, presenting an extremely asymmetric relationship therebetween. Consequently, the driving method of Philips can not individually and selectively erase the data stored in each row of pixels and then rewrite new data into each row of pixels. Rather, the contents of the display is renewed by selectively writing data into each row of pixels after collectively erasing the data from the entire screen of pixels.

Electro-optical devices using the HTN mode must satisfy various requirements to produce the desired hysteresis characteristics. Hysteresis characteristics vary depending on such factors as twist angle, cell gap, pre-tilt angle within the liquid crystal panel of the electro-optical device, spontaneous pitch, elastic constants, dielectric constants of the liquid crystal composition and interaction between the orientation film (i.e. interface regulating force) and liquid crystal molecules. Typically, the pre-tilt angle, twist angle, interface regulating force, and elastic constant ratios of K33/K11 and K33/K22 are relatively large. The ratio of dielectric anisotropies represented by $\Delta\epsilon/\epsilon\perp$ and deviation of $\Delta P = Pc/Ps - 1$ are generally relatively small. Pitch Pc is determined by orientation processing of a liquid crystal cell. Pitch Ps represents the spontaneous pitch of the liquid crystal composition.

As shown in FIG. 3, the driving method used in an electro-optical device employing a conventional HTN driving mode is based on maintaining a scan line corresponding to a pixel whose contents is to be erased at substantially zero volts during an erasing period $t_e$. Erasing period $t_e$ immediately follows a holding time $t_{h1}$ during which time data from a current frame of the display is held in the pixels by providing a holding voltage $\pm V_h$. The value of holding voltage $\pm V_h$ is set based on the voltages within the hysteresis loop of the voltage-transmissivity or voltagereflectivity curve. Data provided on a data line is written into the pixel during a writing time $t_s$ by providing a writing pulse having a width $P_w$ on a corresponding scan line. Erasing period $t_e$ of the current frame immediately precedes writing time $t_s$ of the next frame of the display.

Multiplex driving in which a conventional HTN driving method is employed updates the display contents of a matrix of pixels forming a complete liquid crystal panel through batch erasing followed by a writing process using sequential scanning. More particularly, a conventional HTN driving method collectively erases the entire display at one time and then rewrites the display through sequential scanning. The time during which data is displayed by pixels associated with the initial scan line selected as opposed to pixels associated with the last scan line selected is significantly different. Therefore, erasing of that portion of the display associated with the last stage of the scanning period is conspicuous.

For example, in a conventional HTN driving method in which writing time $t_s$ is 0.2 milliseconds per line and erasing period $t_e$ is 50 msecs, a display having 1000 lines (i.e. rows of pixels) will result in the first row of pixels having data written therein after 50 msecs from the initiation of erasing period $t_e$. The last row of pixels will have data written therein after 250 msecs from the initiation of erasing period $t_e$. Similarly, for a screen having 500 lines, the 500th line will have data written therein after 150 msecs from the initiation of erasing period $t_e$. The delay between writing of data between the first and last line of the screen coupled with erasing of the entire screen at one time (i.e. batch erasing) creates a flashing (i.e. flickering) effect on the screen especially prominent around those pixels associated with the last scan lines to be selected. The more lines on the display, the more prominent will be the flashing. In other words, the conventional HTN driving method requires lines scanned during the latter part of the scanning period to appear without data (i.e. blank) for longer periods of time than lines scanned during the initial stages of the scanning period.

Where rewriting of each line of the display is based on providing a minimum erasing time and a reasonable interval between writing times on successive lines, the lines associated with the end of the scanning period will appear to display data for a relatively short period of time compared to lines associated with the beginning of the scanning period. A decline in the display quality (i.e. non-uniform display density) results.

Accordingly, it is desirable to provide a method for driving a liquid crystal type electro-optical device employing a HTN mode in which data is stored on all lines of the display for substantially the same period of time resulting in a display which avoids a flashing effect on the screen.

SUMMARY OF THE INVENTION

Generally speaking, in accordance with the invention, a method of driving an electro-optical device having a plurality of scan lines, data lines, and pixels includes the steps of providing data on at least one of the data lines, storing the data in at least one of the pixels during a writing period by providing at least one scan line with a writing signal, maintaining the data within the at least one pixel during a holding period by providing a holding signal on the at least one scan line and erasing data stored in each pixel by providing each scan line and data line with an erasing signal during an erasing period, wherein the erasing period for each scan line occurs over substantially the same length of time after the completion of one holding period and before the beginning of the next writing period.

For each scan line, the absolute value of the effective voltage level of the erasing period is less than the absolute value of the peak voltage level of the holding signal. The writing signal is provided to each scan line at a different point in time and the holding period occurs immediately following the writing period. Similarly, the erasing period of each scan line is begun at a different point in time.

Each writing signal includes a selecting pulse having a predetermined width. For each scan line, the initiation of each erasing period is delayed in time by more than the width of the selecting (i.e. voltage) pulse provided during the previous writing period.

The effective voltage level of the erasing period is preferably less than $(2/3)^{1/2}$ times the maximum level of the holding signal. In one embodiment of the invention, the holding signal provided on each scan line includes a plurality of voltage pulses encompassing a period of time greater than one fourth the writing period.

In another alternative embodiment of the invention, the erasing signal includes at least one voltage pulse having a peak value greater than the maximum value of the holding signal wherein the at least one voltage pulse of the erasing signal occurs at the beginning of the erasing period. In yet another alternative embodiment of the invention, the erasing signal includes at least one voltage pulse having a peak value at least equal to the maximum value of the writing signal.

Advantageously, by using the invention the cell gap margin within the liquid crystal panel can be increased resulting in higher manufacturing yields of liquid crystal panels.

Accordingly, it is an object of the invention to provide an improved method for driving a liquid crystal type electro-optical device in which the erasing time per scan line is substantially the same.

It is another object of the invention to provide an improved method for driving a liquid crystal type electro-optical device in which the holding time per scan line is substantially the same.

It is a further object of the invention to provide an improved method for driving a liquid crystal type electro-optical device employing an HTN mode which sequentially erases, writes and holds data for each line of pixels thereby avoiding a flashing effect on the screen.

It is still another object of the invention to provide an improved method for driving a liquid crystal type electro-optical device in which the data is not erased from a matrix of pixels at the same time.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a timing diagram illustrating the driving waveforms in a prior art liquid crystal electro-optical device employing an HTN mode of operation;

FIG. 4 is a plot of writing voltage versus its pulse width;

FIGS. 6(*a*) and 6(*b*) are block and block-and-circuit diagrams for producing certain driving waveforms of FIG. 5;

FIG. 7 is a timing diagram illustrating signal waveforms used in FIGS. 6(*a*) and 6(*b*);

FIGS. 13(*b*)–(*f*) are timing diagrams of driving waveforms in accordance with the present invention;

FIG. 17(*a*) is a fragmented plan view of a liquid crystal type electro-optical device;

FIG. 17(*b*) is a sectional view of the liquid crystal type electro-optical device taken along line A-A' of FIG. 17(*a*); and FIG. 18 is a partial circuit diagram of a driving system of the liquid crystal type electro-optical device.

DESCRIPTION OF THE PREFERRED EMBODIMENTS

In accordance with a first embodiment of the invention, SiO is deposited at an incident angle of approximately 85° on a transparent electrode (not shown) formed in a striped configuration which is then sintered into a deposit of $SiO_2$. The deposit of $SiO_2$ causes the liquid crystal composition to form a pre-tilt angle of approximately 25° at the boundary with the $SiO_2$ deposit.

Liquid crystal cells using the $SiO_2$ deposit with twist angles between the upper and lower substrates of approximately 270 and a cell gap of approximately 4.4 μm were then filled with a liquid crystal composition of ZLI-3187, made by E. Merck of West Germany, which included a 2.4 wt% chiral dopant CB-15 made by BDH Chemicals Ltd. (BDH Corp.) of England. A liquid crystal display unit (i.e. electro-optical device) using these liquid crystal cells was then manufactured having a dot matrix of 750×1120 pixels.

Figure 2A:
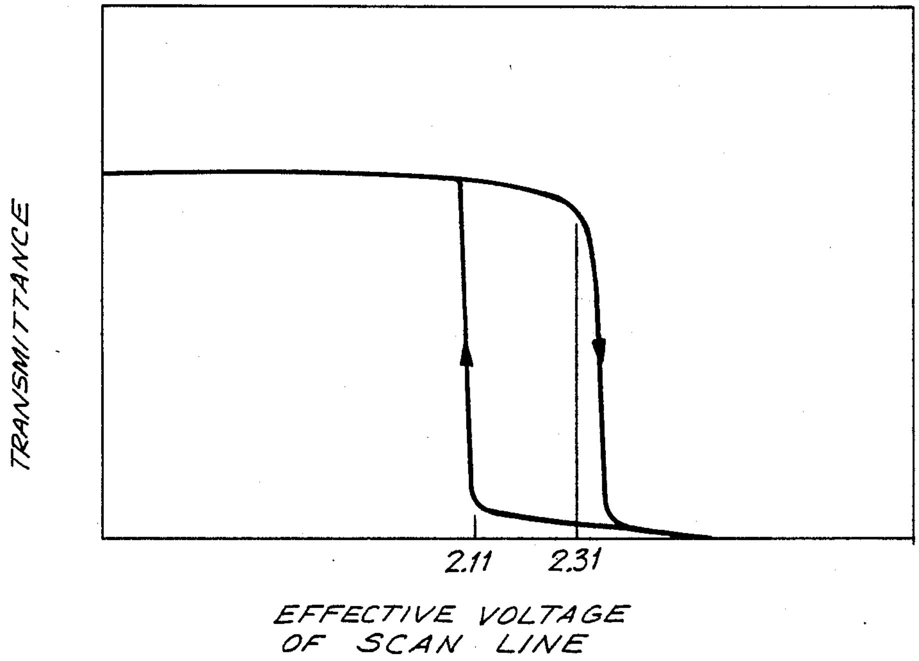
FIGS. 2(*a*) and 2(*b*) are plots of transmittance versus the scan voltage.
Figure 2B:
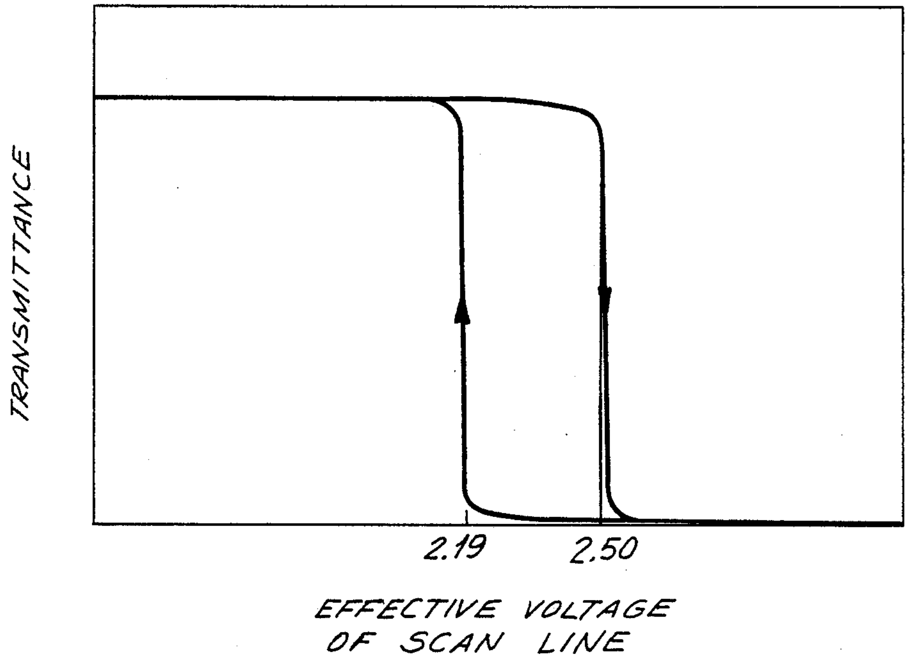

With this electro-optical device driven at a temperature of approximately 30° C., the hysteresis characteristics of FIG. 2(*a*) were produced. The effective value of holding voltage $V_h$ required to maintain the data stored in a line (row) of pixels varied between 2.11 volts and 2.31 volts, depending on the transmittance level within the hysteresis loop.

FIG. 4 illustrates the relationship between a writing voltage $V_w$ and its pulse width Pw of the electro-optical device. A curve "a" denotes the maximum writing voltage $V_w$ of the electro-optical device and a curve "b" represents the minimum writing voltage $V_w$. The cross-hatched region of FIG. 4 represents the region of permissible values of writing voltage Vw. Those values of writing voltage Vw below curve "b" were insufficient to allow data to be written into a pixel, that is, the pixel was in its OFF state whereas a writing voltage $V_w$ within the cross-hatched region switched the pixel to its ON state. Pulse width Pw can be increased and/or writing voltage Vw can be decreased to enlarge the driving margin of the pixel.

By applying the driving waveforms shown in FIG. 3 and based on the electro-optical device described above, an erasing period $t_e$ of approximately 13 msecs was required to erase the contents of the pixels when applying a conventional HTN driving method. During erasing period $t_e$ no voltage is applied to the scan line corresponding to the line of pixels whose contents are to be erased. Holding voltage $V_h$ is substantially a train of bipolar pulses alternating between a value of +Vh and −Vh. Erasing period $t_e$ immediately follows a holding period $t_{h1}$ and immediately precedes the next selecting (writing) signal Vw occurring during a selecting time $t_s$. Writing signal Vw when applied to a scan line permits data provided on a data line to be stored in the pixel. By immediately thereafter providing holding voltage Vh during a holding period $t_{h2}$, the data stored in the pixels will be held therein until the next erasing period $t_e$ occurs. Erasing period $t_e$ is applied to all lines of the display at the same time resulting in the aforementioned drawbacks including the flashing effect.

Figure 5:
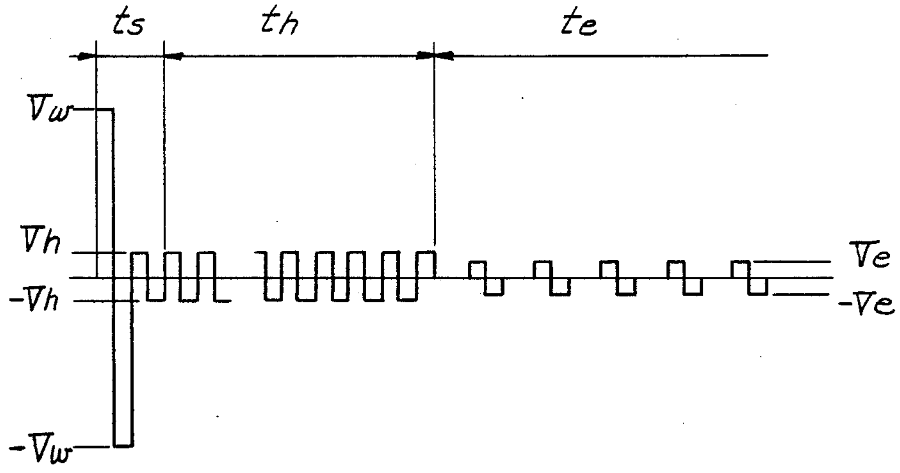
FIG. 5 is a timing diagram illustrating the driving waveforms applied to a liquid crystal type electro-optical device in accordance with the invention.

The invention overcomes the flashing effect by providing that each line of pixels has its contents erased for substantially the same period of time. More particularly, as shown in FIG. 5, one or more erasing voltages $V_e$ is selectively applied to the scan lines during erasing period $t_e$ to slow down the rate at which the contents of pixels associated with the later stages of the scanning period are to be erased. If these voltage pulses during erasing period $t_e$ are intermittently applied and are at the same voltage level as holding voltage $V_h$, the contents of a line of pixels can be erased within 21 msecs when holding voltage $V_h$ is at its lower limit of 2.11 volts and within 29 msecs when holding voltage $V_h$ is at its upper limit of 2.31 volts. Preferably, the holding voltages for each scan line will be set at approximately the lower limit of 2.11 volts to increase the speed at which the contents of each line of pixels is erased. In other words, the lower limit of holding voltage $V_h$ within the hysteresis loop should be used to minimize erasing period $t_e$.

By lowering holding voltage $V_h$, however, the capability of the pixels to hold the written contents therein decreases. Under such circumstances, it is desirable to add waveforms which have no erasing period as part of the stored contents of the pixel. This kind of rewriting of the display content is particularly effective under circumstances where a portion of the display content is not erased as well as where other lines are.

FIGS. 17(*a*) and 17(*b*) are fragmented plan and cross-sectional views of an electro-optical device 200. Device 200 includes a pair of transparent electrodes 201 and 218 which are disposed adjacent to a pair of transparent substrates 209 and 212, respectively. A pair of polarizers 203 and 206 are disposed on the outer surfaces of substrates 209 and 212, respectively. A liquid crystal layer 215 fills the gap separating electrodes 201 and 218 from each other. Transparent electrodes 201 and 218 serve as scan (i.e. common) lines and data (i.e. segment) lines, respectively. As shown in FIG. 18 the scan lines include Scan Line (1) - Scan Line (m) or Scan Line (n) and the data lines include Data Line (1) Data Line (p).

Figure 1:
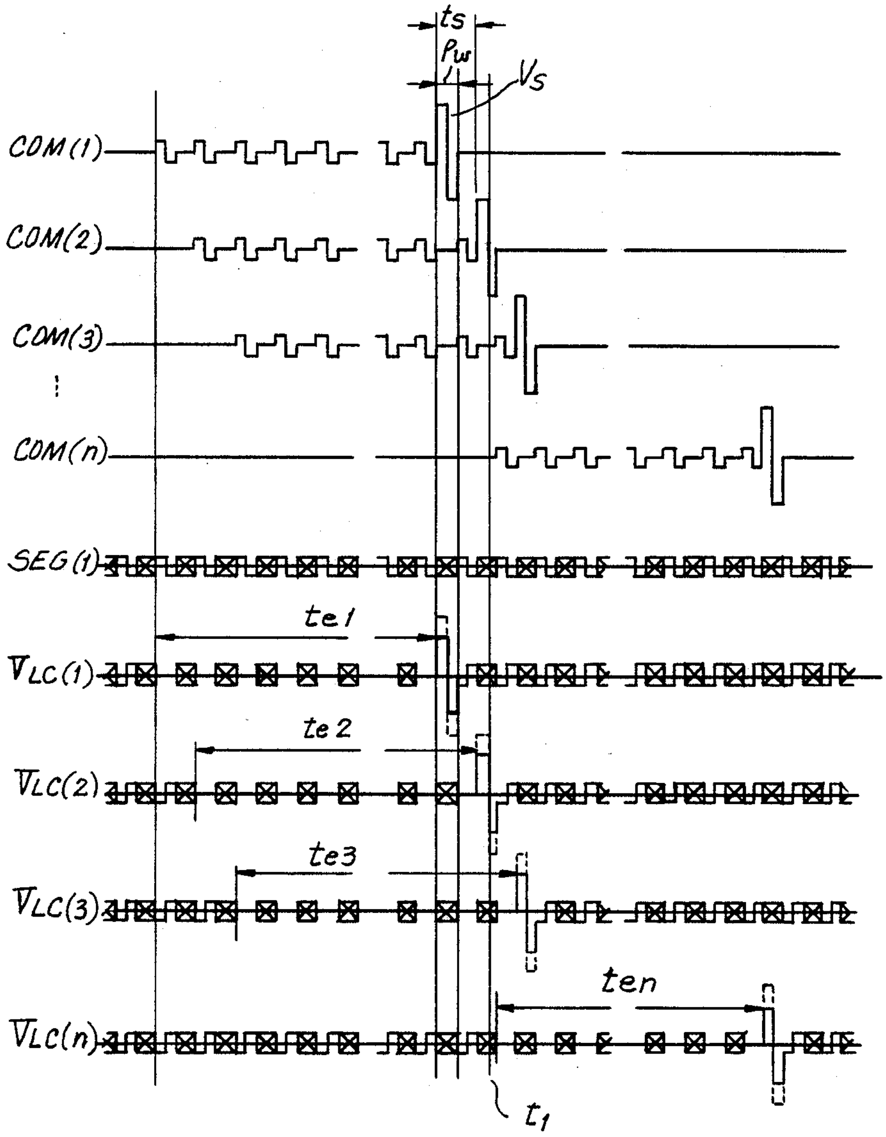
FIG. 1 is a timing diagram illustrating the driving waveforms in accordance with a first embodiment of the invention.

FIG. 1 illustrates the driving waveforms used in multiplex driving of the electro-optical device. The driving circuitry of the device is shown in FIG. 18. Signal waveforms COM(1) - COM(n) of FIG. 1 are applied to Scan Line (1) - Scan Line (n) of FIG. 18. SEG(1) is a data signal waveform applied to the first Data Line (1) of FIG. 18. Voltages $V_{LC}(1)$ - $V_{LC}(n)$ are synthesized waveforms applied to pixels (FIG. 17(*a*)) disposed orthogonal to Data Line (1) on Scan Line (1) Scan Line (n), respectively. Each of the synthesized waveforms is equal to the difference between the data signal waveform and the scan signal waveform (e.g. $V_{LC}(1)=SEG(1)-COM(1)$).

The driving waveforms of FIG. 1 exhibit the following characteristics:

1. The signals during the erasing period are in phase at a given cycle with one another and are applied to all Data Lines. One complete cycle of a selecting period $t_s$ is equal to twice writing time $P_w$. Each erasing signal is a series of inversion pulses having positive and negative polarities in which each pulse has a width of one half writing period $P_w$ and in which the absolute values of these inversion pulses are equal to that of holding voltage $V_h$.

2. Erasing signals (i.e. inversion pulses) are applied to those scanning lines in which the display content is to be erased and at the same time are also applied to the data lines. The erasing signals applied to the data line and to the scan line, that is the inversion pulses, have the same phase and voltage level. The voltage level of synthesized waveforms $V_{LC}$, which are impressed on the liquid crystal cell, can be set to zero volts during the time in which the erasing signals are applied to both the scanning lines and data line. When erasing signals are not applied to the scan lines, the erasing signals applied to the data lines hold the contents of the pixel.

3. The erasing signals, which are applied on the scan lines, during erasing period $t_e$ are staggered relative to one another, that is, begun at different points in time relative to one another such that the initiation of the erasing period between adjacent scan lines are separated in time by a value greater than or equal to $t_s$.

4. Each scan line has the same erasing period $t_e$. The length of erasing period $t_e$ is adjusted in accordance with the liquid crystal composition, panel structure and temperature characteristics of the electro-optical device.

The invention provides a driving method in which the scan lines may be at different scanning stages at the same time. For example, the driving method of the invention provides that:

1. Scan Line (1) with signal waveform COM(1) can be within its holding period $t_h$;

2. Scan Line (2) with signal waveform COM(2) can be within its writing period after writing pulse $V_w$ has been applied;

3. Scan Line (3) with signal waveform COM(3) can be within its erasing period $t_e$; and 4. Scan Line (n) with signal waveform COM(n) can be within its holding period $t_h$ from the previous frame.

In other words, the invention allows the state of each scan line to be arbitrarily set within the same display frame. Therefore, erasing period $t_e$ for each scan line also can be arbitrarily set. The length of erasing time $t_e$ for each scan line does not depend on the state of any other scan line. Erasing time $t_e$ can be set at a predetermined constant length of time for each scan line. Consequently, as the number of scan lines increases, erasing time $t_e$ is relatively decreased.

By impressing a substantially zero voltage level on each of the scan lines of the liquid crystal panel, the display can be erased twice as quickly as when using a batch type erasing method in a conventional HTN driving system.

By decreasing the voltage level of the power source needed during the driving process, the erasing signals applied at a given cycle (i.e. inversion pulses) can be set at the same voltage level as holding voltage $V_h$. The cycle, waveform and voltage level of the erasing signal, however, need not necessarily conform to this requirement. For example, by applying a waveform having an effective value of voltage during erasing period $t_e$ which is less than the lower limit of holding voltage $V_h$ and is proximate to a zero voltage level the speed at which the contents of a line of pixels is erased can be increased. It is also possible to apply a substantially effective zero voltage level and a high voltage pulse waveform during erasing period $t_e$ to diminish the latter, that is, deviating the voltage level of the erasing signal from the level of holding voltage $V_h$ while reducing the effective voltage during erasing time $t_e$.

With a selecting voltage $V_s$=15.0 volts, holding voltage $V_h$=2.11 volts and selecting time $t_s$=0.5 msecs, the display of pixels associated with respective scan lines disappears within a period of 21 msecs and the time required for rewriting the entire picture (i.e. screen) is 325 msecs. The contents of the display is erased without being readily perceived. In particular, approximately 40 lines of display at one time appear to be somewhat thinner than the other lines on the screen. A much higher quality display results compared to conventional driving methods wherein all scan lines are erased simultaneously by impressing substantially a zero voltage level on the entire panel.

In contrast to the invention, the conventional batch type erasing method employing a HTN mode of operation produces lines of pixels in which the display disappears for as much as 340 msecs, creating an undesirable flashing effect on the screen. The flashing (i.e. flicker) effect is extremely conspicuous when the display content is not to be varied by more than several times the time required for rewriting one frame. The invention under such conditions, however, presents no flicker effect. Therefore, the frame cycle does not adversely influence the display quality as appreciably as does the conventional method for driving an electrooptical device.

FIGS. 6(*a*) and 6(*b*) illustrate circuits 100 and 110 for producing the signal waveforms (COM) and data signals (SEG), respectively. As shown in FIG. 6(*a*), a plurality of transmission gates 601 control whether signal waveform COM(1) assumes a level of $\pm V_s$, $\pm V_h$ or ground (G). The selection of one of these signals as COM(1) is based on the input of voltages 701–705 illustrated in FIG. 7. Signal waveform COM(1) is also shown in FIG. 7.

As shown in FIG. 6(*b*), a shift register 115 is inputted with data and provides its output to a latch 120. Signals 706 and 707, as shown in FIG. 7, are inputted to the set and reset terminals of latch 120. The output of latch 120 is fed into an exclusive OR gate 123, the other input thereto being a clock signal (see FIG. 7). The output of gate 123 is inputted to an inverter 125 and a gate input of a transmission gate 127. The output of inverter 125 is inputted to a gate input of a transmission gate 131. Depending on the output of gate 123, holding voltage $+V_h$ or holding voltage $-V_h$ is passed through transmission gates 127 or 129, respectively, and serves as data signal SEG(1). More particularly, as shown in FIG. 7, data signal waveform SEG(1) alternatively assumes holding voltages $+V_h$ and holding voltage $-Vh$.

In a second embodiment of the invention, an electrooptical device having an HTN type panel with an array of pixels forming 400 ×640 dots was used. The orientation of the electro-optical device is similar to the first embodiment. The liquid crystal panel is arranged with a SiO rhombic deposit, a pre-tilt angle of 25°, a twist angle of 270° and a cell gap of 6.0 μm. Sealed within the liquid crystal panel was the liquid crystal composition of ZLI-1132 made by E. Merck having a 1.5 wt% chiral dopant CB-15 added thereto and made by BDH Corp.

Figures 13A, 13B, 13C, 13D, 13E, 13F:
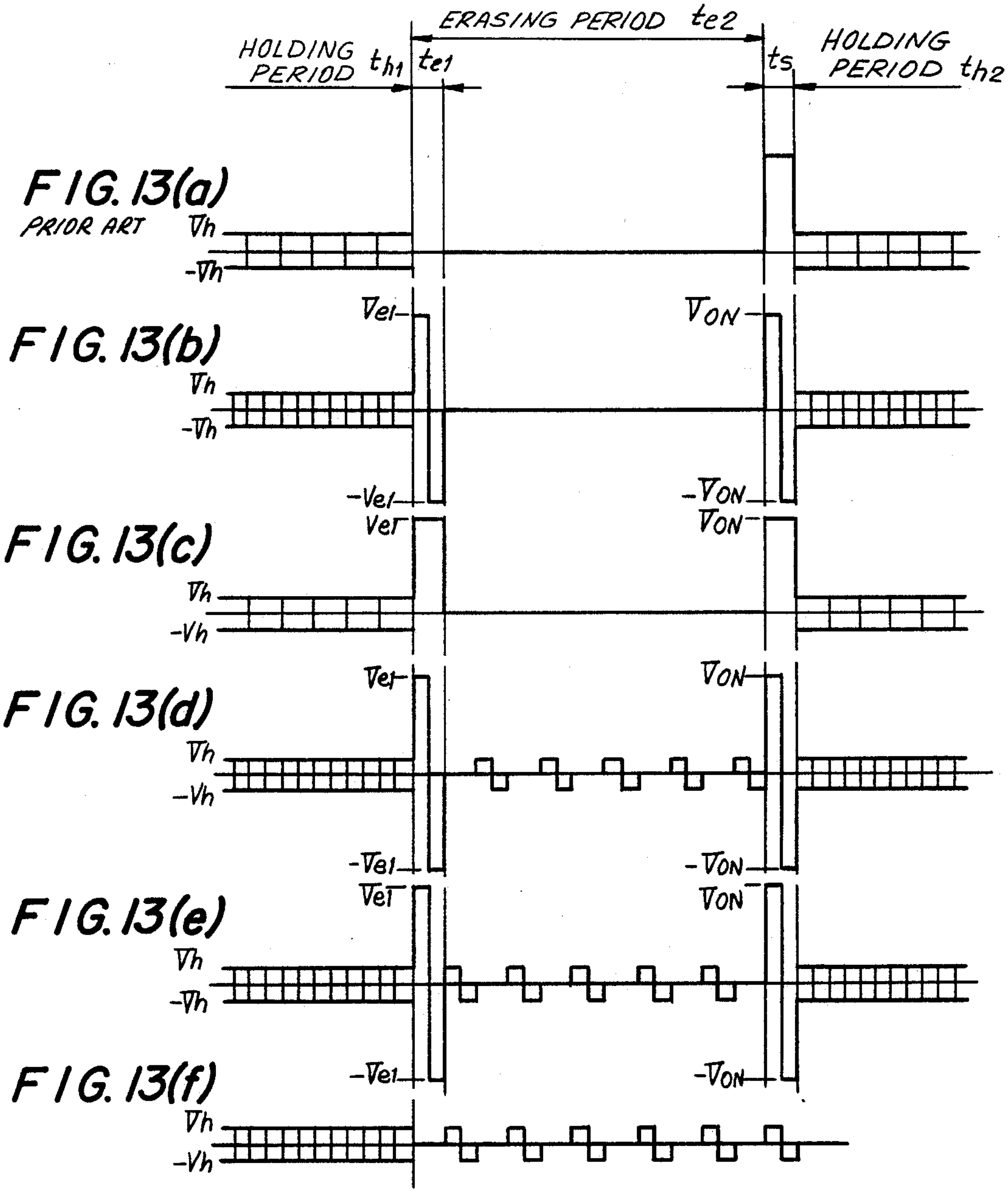
FIG. 13(a) PRIOR ART
FIG. 13(*a*) is a timing diagram of driving waveforms applied to a prior art liquid crystal type electro-optical device.

As shown in FIG. 13(*a*) the erasing period $t_e$ is 50 msecs at an operating temperature of 25° C. using a conventional HTN method of driving. FIGS. 13(*b*) and 13(*c*) illustrate the driving waveforms of the invention. High voltage pulses of levels $\pm V_{e1}$ of duration $t_{e1}$ within n erasing period $t_{e2}$ are provided. A writing pulse $\pm V_{ON}$ is applied to the scan line for a selection period $t_s$. The absolute value of writing voltage $V_{ON}$ is equal to the absolute value of high voltage erasing pulse $V_{e1}$. The time within which the contents of the display can be erased in FIGS. 13(*b*) and 13(*c*) is 40 msecs.

FIGS. 13(*d*) and 13(*e*) include both a high voltage pulse of levels $\pm V_{e1}$ and a plurality of interrupted voltage pulses (inversion pulses) at magnitudes approximately equal to $\pm V_h$. By providing these inversion pulses during erasing period $t_{e2}$ the erasing time is extended to approximately 96 msecs and 104 msecs in FIGS. 13(*d*) and 13(*e*), respectively.

When the liquid crystal panel of the second embodiment is multiplex driven with selecting voltage $V_{ON}=10.5$ volts, holding voltage $V_h=1.5$ volts and selecting time $t_s=1$ msec the last scan line to be selected in a frame using a conventional HTN method for driving (as shown in FIG. 3) will be erased for approximately 450 msecs. In contrast thereto, in accordance with the second embodiment of the invention using the driving waveforms of FIGS. 13(*d*) and 13(*e*), the time in which the display contents disappears with respect to each scan line is approximately 100 msecs. Additionally, since the entire display does not disappear at once, no flashing effect takes place on any portion of the display. An enhanced display results.

A third embodiment of the invention is based on a liquid crystal panel manufactured substantially similar to the first embodiment. In the third embodiment, the device is driven at a temperature of approximately 25° and exhibits a transmittance voltage curve as shown in FIG. 2(*b*). Holding voltage $V_h$ based on the hysteresis loop shown in FIG. 2(*b*) varies between 2.19 and 2.50 volts, that is, a 0.31 voltage width.

Figure 8:
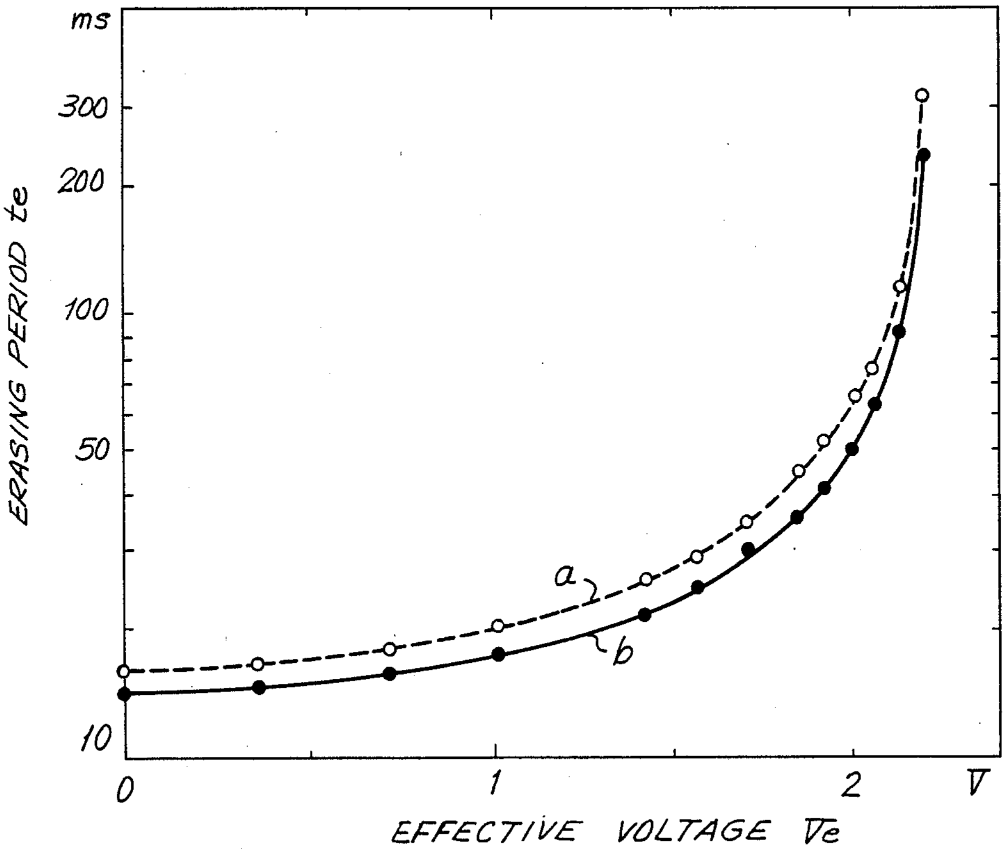
FIG. 8 is a plot of time versus the effective voltage during an erasing period.

As shown in FIG. 5, during erasing time $t_e$ the voltage applied to each scan line whose contents is to be erased varies between a voltage level $V_e$, and zero volts. Erasing period $t_e$ varies based on, in part, the level of voltage $V_e$ and, in part, based on holding voltage $V_h$. More particularly, as shown in FIG. 8, a curve "a" represents erasing period $t_e$ with holding voltage $V_h=2.50$ volts. A curve "b" represents erasing period $t_e$ with holding voltage $V_h=2.19$ volts. When the effective voltage level of the erasing period $t_e$ is equal to a value equal to or greater than curve "b" but no greater than curve "a", the scan voltage falls within the hysteresis loop of FIG. 2(*b*) preventing the display contents from being erased.

Figure 9:
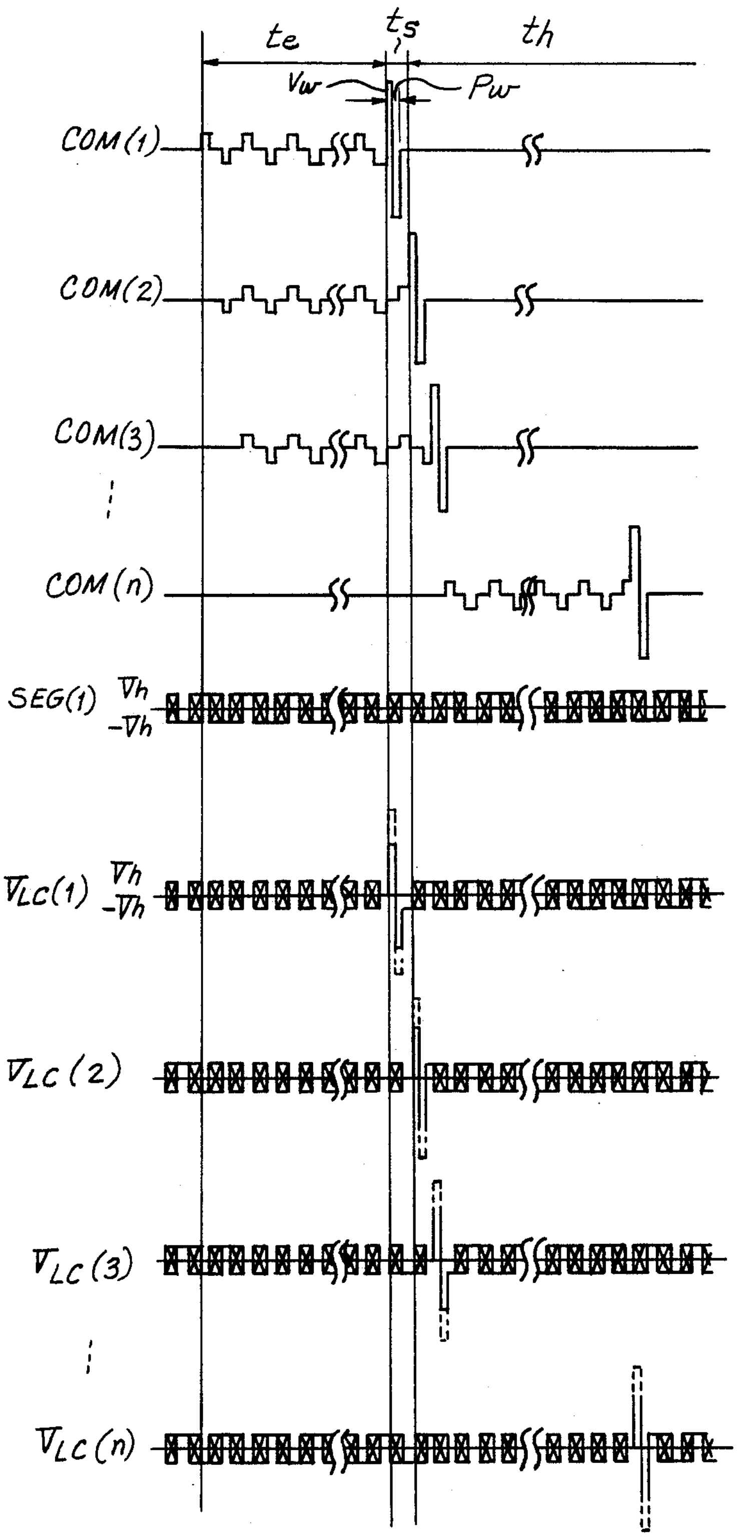
FIG. 9 is a timing diagram of driving waveforms in accordance with a third embodiment of the invention.

FIG. 9 illustrates the driving waveforms in this third embodiment of the invention. Writing signal $V_w$ has a pulse duration equal to selecting time $t_s/1.5$. Bipolar inversion pulses which serve as erasing signals, extend for the same time duration as writing signal $V_w$ (i.e. equivalent to one division of selecting time $t_s$) Therefore, each of the two inversion pulses forming the bipolar inversion pulse has a pulse width $P_w$ equal to ⅓ selecting time $t_s$. The data signal waveform on each data line has either a voltage level $+V_h$ or $-V_h$. The state of each line of pixels is in accordance with the timing at which its corresponding writing voltage $V_w$ (i.e. the selecting signal) is applied.

For a time duration equivalent to ⅓ the remaining selecting time $t_s$ for which no data signal is applied, a plurality of erasing signals $S_e$ having voltage levels $\pm V_h$ are applied at the same phase to all data lines. The SEG waveforms except those portions marked with are erasing signals Se. Similarly, erasing signals $S_e$ are applied to each scanning line during erasing period $t_e$ and have the same timing and voltage levels as erasing signals $S_e$ applied to the data lines. Synthesized waveforms applied to the liquid crystal panel associated with each pixel may be set at zero volts while erasing signals $S_e$ are being applied. As a result, synthesized waveforms are applied to each pixel of the liquid crystal panel such that voltage $V_h$ is applied for ⅔ of erasing time $t_w$. The effective value of the voltage during the erasing time is defined as $(\frac{2}{3})^{\frac{1}{2}} \times V_h = 0.816 \times V_h$.

Erasing time $t_e$, selecting time $t_s$ and holding time $t_h$ are associated with the first scan line. The driving method of the invention when using the waveforms shown in FIG. 9 with selecting voltage $V_s$ (i.e. $V_w$) $=15.0$ volts, holding voltage $V_h=2.50$ volts, erasing voltage $V_d=2.50$ volts and selecting time $t_s=0.5$ msecs results in the effective value of 2.04 volts during erasing period $t_e$. The display contents of the pixels on respective scan lines can be erased within a period of approximately 60 msecs. Only one seventh of the entire display panel appears at any instant in time to have somewhat thinner lines (i.e. due to their disappearance) which is barely perceptive. The time necessary for rewriting the entire picture is 435 msecs which is 50% greater than the scanning time required for scanning all scanning lines when no erasing pulses are included within erasing time $t_e$ (i.e. the effective value equals zero volts). The improved level of the display is quite apparent compared to the conventional driving method. In particular, based on the batch erasing method used in the conventional HTN system, pixels selected during the final portion of the selecting period are erased for as much as 390 msecs making the contents of such pixels difficult to see.

When the display content is to be refreshed at 500 msec intervals using the conventional HTN driving method, pixels associated with selecting lines which are rewritten at the beginning of the selecting sequence display their contents for about 400 msecs and are without any contents for approximately 130. Those pixels associated with scan lines during the final portion of the scanning sequence display their contents for less than 200 msecs and are without any contents for approximately 300 msecs. An apparent difference between portions of the display (i.e. display density) is quite apparent. In sharp contrast thereto, the driving method of the invention results in pixels associated with any one scan line appearing to be somewhat thin for only approximately 60 msecs or less. Consequently, the display densities on the entire display are substantially the same resulting in an enhanced level of display.

If the selecting time is divided into less divisions (i.e 1.33 divisions) and the rate at which the voltage during erasing time $t_e$ is substantially at zero volts is further decreased, the effective voltage level during erasing period $t_d$ can be made equal to $(\frac{3}{4})^{\frac{1}{2}} = 0.87 \times V_h$. Preferably, the effective voltage during erasing period $t_e$ should not exceed 80% of holding voltage $V_h$. With the selecting time divided into 1.5 divisions, however, the 20% $V_h$ margin cannot be ensured and therefore is not particularly desirable.

Figure 10:
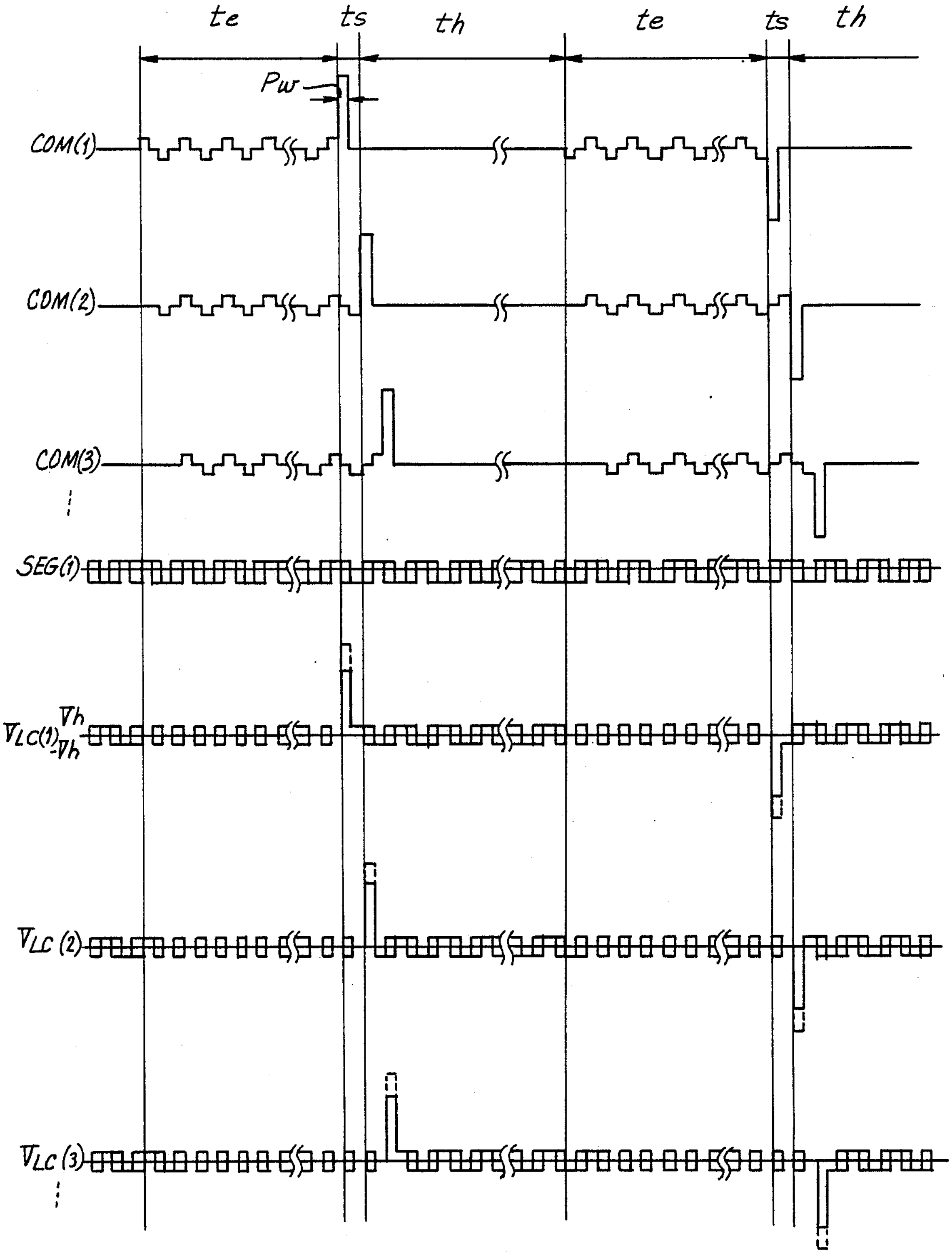
FIG. 10 is a timing diagram of driving waveforms in accordance with a fourth embodiment of the invention.

Driving waveforms in accordance with a fourth embodiment of the invention are shown in FIG. 10. Selecting time $t_e$ per scan line is divided in half rather than in divisions of ⅓ as described in connection with a third embodiment. Unipolar pulses each having a pulse width of $P_w$ and having a time duration of one half selecting time $t_s$ serve as the selecting signals. Applied to respective data lines are data signals of voltage levels $V_h$ corresponding to the display state of respective pixels. The timing of the display state of the pixels is based on the timing at which the writing signals are applied to individual scan lines. For a period equal to the time during which no data signal is applied (i.e. one half of selecting time $t_s$) erasing signals $S_e$ are applied at the same phase to all data lines at voltage levels $\pm V_h$. Erasing signal $S_e$ are also applied to respective scan lines during erasing time $t_e$ and have the same timing and voltage levels as those erasing signals $S_e$ which are applied to the data lines. Synthesized waveforms $V_{LC}$ which are applied to each pixel of the liquid crystal can be set at zero volts during the time during which erasing signals $S_e$ are applied to the scan lines.

By setting the synthesized waveforms as described above, the effective value of the synthesized waveforms is defined as $(\frac{1}{2})^{\frac{1}{2}} \times V_h$. Each frame of the display is equal to $(t_e+t_s+t_h)$. The voltage polarity of each synthesized waveform is inverted per frame with no direct current component applied to the liquid crystal. The polarities of erasing signals $S_e$ are alternately inverted whereby respective pixels undergo a successive application of a train of pulses.

Based on applying the driving waveforms of FIG. 10, an electro-optical device defined by selecting voltage $V_s=18.0$ volts, holding voltage $V_h=2.19$ volts, erasing signal voltage $V_e=2.19$ volts and selecting time $t_s=0.5$ msecs results in an effective value of 1.55 volts during erasing periods $t_e$. The display contents of pixels on respective scan lines disappears for approximately 25 msecs which is barely perceptible. An improved display quality results. The time required for renewing the overall picture is approximately 400 msecs which is twice as much time as required when no erasing signal is applied. Less than 1/16 of the entire display panel will appear with relatively thin lines. Some fluctuations in writing voltage $V_s$ and holding voltage $V_h$ are produced when a relatively long hold period $t_h$ is employed and are due to influences of iron impurities resulting in a decline in the reliability (i.e. level) of display quality. Preferably, driving waveforms at a relatively high frame frequency should be used.

Figure 11:
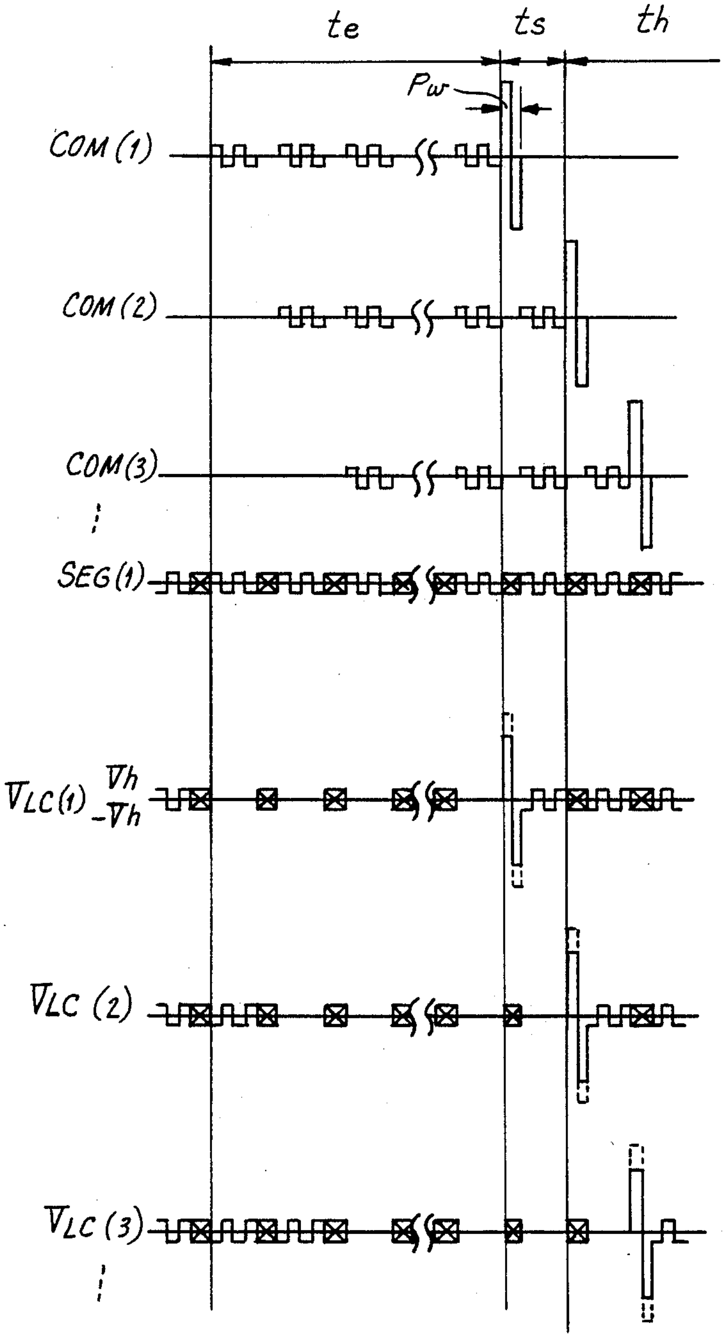
FIG. 11 is a timing diagram of driving waveforms in accordance with a fifth embodiment of the invention.

Driving waveforms in accordance with a fifth embodiment of the invention are shown in FIG. 11. Selecting time $t_s$ per scan line is divided by a factor of three similar to the third embodiment of the invention. Bipolar inversion pulses with positive and negative voltage peaks, each having a pulse width $P_w$ of one sixth of selecting time $t_s$ can be applied as erasing signals (i.e. for a total time of $\frac{1}{3}$ selecting period $t_s$) and are used as selecting signals $V_s$. During erasing period $t_e$ data signals are applied to each pixel with a duty of one third of selecting time $t_s$ and also at zero volts for a duty of three fourths of selecting time $t_s$. As a result, the effective value of the synthesized waveforms applied to each pixed of the liquid crystal panel during the erasing time $t_e$ have a value of $(\frac{1}{3})^{\frac{1}{2}}V_h$. With the electro-optical device driven by selecting voltage $V_s=20.0$ volts, holding voltage $V_h=2.19$ volts, erasing signal $V_e=2.19$ volts and selecting time $t_s=0.6$ msecs, the effective value of the voltage waveforms during erasing time $t_e$ is 1.26 volts. The display contents of the pixels can be erased on respective scan lines in approximately 19 msecs. Approximately 469 msecs are required to renew the overall picture. Approximately 1/25 of the entire display panel is rewritten at any one time resulting in a remarkably enhanced display as compared to displays using the conventional HTN driving method.

Figure 12:
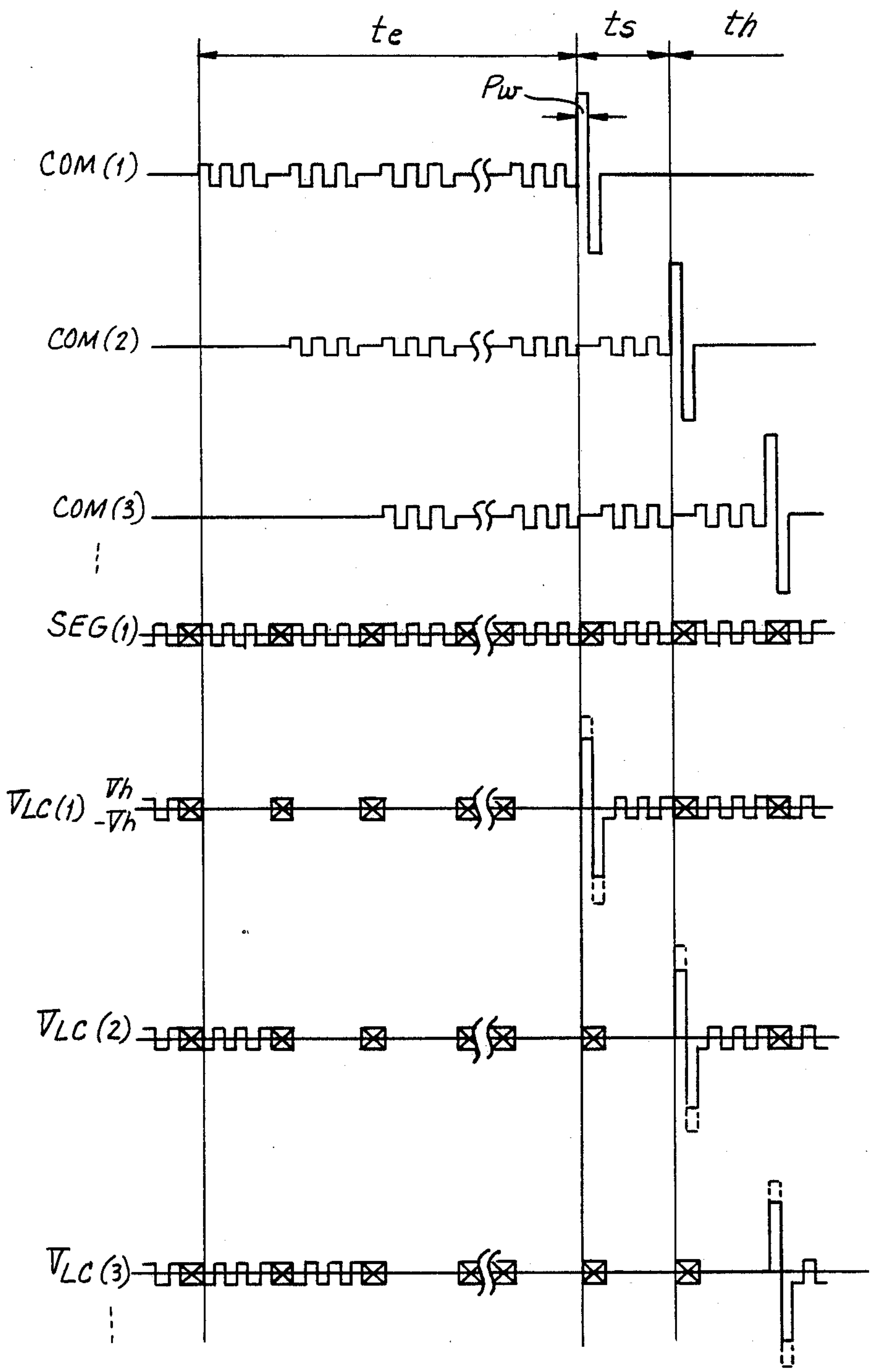
FIG. 12 is a timing diagram of driving waveforms in accordance with a sixth embodiment of the invention.

Driving waveforms in accordance with a sixth embodiment of the invention are shown in FIG. 12. Selecting time $t_s$ per scan line is now split into four divisions. Bipolar inversion pulses each having a pulse width $P_w$ of $\frac{1}{8}$ selecting period $t_s$ and encompassing a total time of one fourth selecting period $t_s$ are used as writing signals $V_w$. Applied to each pixel in erasing period $t_e$ are data signals with a duty one fourth of selecting period $t_s$ and at zero volts for a duty of three fourths of selecting period $t_s$.

The effective value of the synthesized waveforms applied to the liquid crystal of each pixel during erasing time $t_e$ is defined as $(\frac{1}{4})^{\frac{1}{2}} \times V_h = 0.5 \times V_h$. With selecting voltage $V_S=20.0$ volts, holding voltage $V_h=2.19$ volts, erasing voltage $V_d=2.19$ volts and selecting time $t_s=0.8$ msecs the effective value of the voltage waveforms during erasing period $t_e$ equals 1.10 volts. Approximately 18 msecs is required for each scan line to erase the contents of its associated line of pixels. The disappearance of the display content is almost imperceptible. Erasing period $t_e$ is approximately twenty-three times the length of selecting period $t_s$. The time required for scanning the entire picture is approximately 618 msecs which is four times as long as the time required for scanning the entire picture when no erasing signals are applied. Under such conditions the practical maximum limit for scanning has been reached. Less than 1/30 of the entire display panel is erased at any one time. By further reducing the duty ratio of selecting time $t_s$, erasing period $t_e$ can be further decreased. The time required for scanning the entire picture, however, is dramatically increased which is impractical.

In accordance with a seventh embodiment of the invention liquid crystal composition ZLI-3187 made by E. Merck is sealed within the liquid crystal panel in the same manner as in the first embodiment. The addition of the chiral dopant, however, is varied. Normal hysteresis characteristics can be obtained by the addition of chiral dopant CB-15 equal to 1.90 to 1.11 wt% with a value of $\Delta P$ (i.e. $P_c/P_s-1$) ranging from between 0.3 to $-0.2$.

Figure 14:
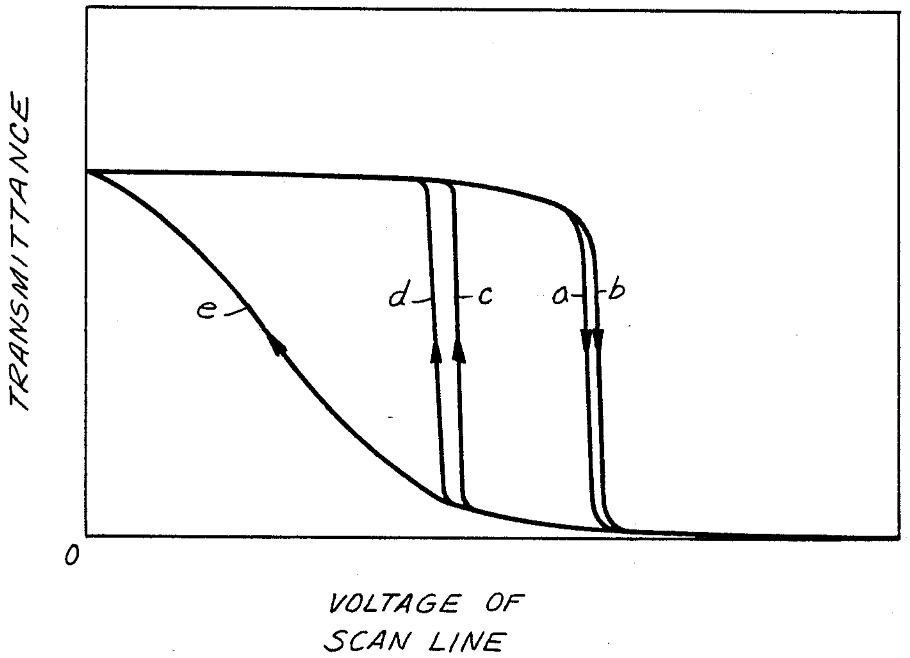
FIG. 14 is a plot of transmittance versus voltage in accordance with a seventh embodiment of the invention.

In a region of the liquid crystal panel where the amount of chiral dopant CB-15$-$1.072, 1.02 wt% and the value of $\Delta P$ ranges from $-0.25$ to $-0.3$, a deformed voltage-transmissivity curve is created as represented by curve "e" of FIG. 14. Under the worst conditions, erasing period $t_e$ lasts several times as long as under normal conditions (e.g. curves a, b or d of FIG. 14). Under such circumstances, abnormal hysteresis characteristics are present within the electro-optical properties of the device. Such characteristics within these electro-optical properties are hereinafter referred to as abnormal hysteresis characteristics. When the amount of chiral dopant CB-15 is lower than 1.02 wt% and the value of $\Delta P$ is $-0.3$ or less, the liquid crystal composition will have low twist angles.

The driving waveforms of an electro-optical device employing a conventional HTN method, exhibiting abnormal hysteresis characteristics, operating at 25° C., having a value of $\Delta P$ equal to $-0.25$, and with erasing time $t_e$ at 50 msecs is shown in FIG. 13(*a*). The driving waveforms at levels $\pm V_{e1}$ having a time duration $t_{e1}$ and voltage pulses at levels $\pm V_{e1}$ having a time duration $t_{e1}$ and beginning at the start of erasing period $t_{e2}$. These high voltage pulses are approximately equal in magnitude to the voltage level $V_{ON}$. Following time $t_{e1}$ the remaining portion of erasing period $t_{e2}$ is at zero volts. The speed at which the contents of the pixels is erased now increases with erasing period $t_e$ equal to 25 msecs. Based on the driving waveforms of FIGS. 13(*b*) or 13(*c*) erasing period $t_{e2}$ has about the same time duration whether the electrooptical device is exhibiting normal or abnormal hysteresis characteristics. As noted previously, an electro-optical device exhibiting normal hysteresis characteristics when subjected to the driving waveforms of FIGS. 13(*b*) or 13(*c*) can erase the contents of pixels on each associated scan line in about 40 msecs even though the effective value of voltage within erasing period $t_{e2}$ has been increased due to the high voltage applied therein. In contrast thereto a conventional HTN driving method requires 45 msecs.

The driving waveforms during erasing period $t_{e2}$ of FIG. 13(*d*) include the high voltage pulses at levels $\pm V_{e1}$ followed by a series of interrupted inversion pulses at voltage levels $\pm V_h$ alternately impressed on the scan line. Between each of these inversion pulses, the respective scan line is at zero volts. Erasing period $t_{e2}$ is about 80 msec.

FIG. 13 (*e*) illustrates driving waveforms in which at the beginning of erasing period $t_{e2}$ high voltage pulses at levels $\pm V_{e1}$ are applied immediately followed by an interrupted series of inversion pulses having magnitudes of $\pm V_h$. Between each of these inversion pulses the respective scan line is at zero volts resulting in erasing period $t_{e2}$ equal to 85 msecs.

FIG. 13(*f*) illustrates driving waveforms in which during erasing period $t_{e2}$ no high voltage pulses at levels $\pm V_{e1}$ are used but rather a plurality of inversion pulses at voltage levels $\pm V_h$ are intermittently applied. As shown by curve f of FIG. 15, when the liquid crystal display panel exhibits abnormal hysteresis characteristics the contents (data) stored in the pixels is difficult if not impossible to erase and requires an extremely long erasing period $t_{e2}$. By applying high voltage pulses during erasing period $t_{e2}$, the erasing response characteristics can be significantly improved.

Figure 15:
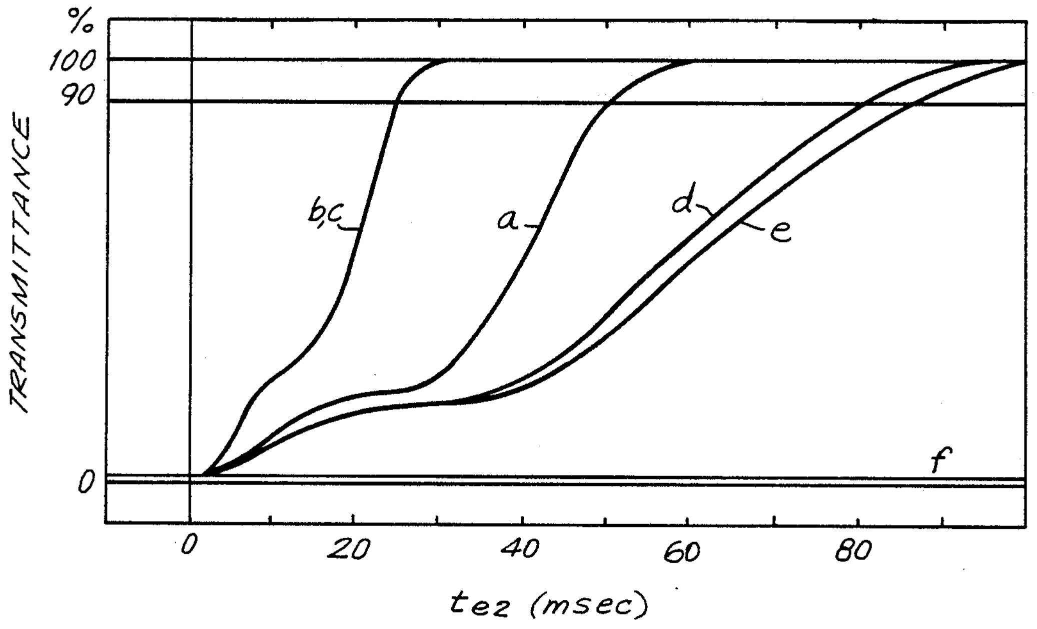
FIG. 15 is a plot of transmittance versus selecting time based on the driving waveforms of FIG. 13.

FIG. 15 represents the optical response characteristics during erasing period $t_{e2}$. Curves a–f correspond to the driving waveforms during erasing period $t_{e2}$ of FIGS. 13(*a*)–(*f*), respectively. Referring once again to FIGS. 13(*a*)–(*c*) in multiplex driving the electro-optical device, the scan lines are sequentially selected after temporarily erasing the entire picture and thereafter are rewritten with new data. To enlarge the driving margin while diminishing writing voltage $V_{ON}$ and increasing selecting time $t_s$, writing voltage $V_{ON}$ is made equal to $V_s - V_h$ (e.g. $V_{ON}=12.0$ volts, $V_h=1.5$ volts and $V_s=10.5$ volts). Using a conventional HTN driving method as shown in FIG. 13(*a*) with selecting time $t_s=1$ msec, the time for which the display content of the pixels on the initially selected scan line disappears is about 40 msecs or less and the time during which the finally selected scan line appears with no data is approximately 450 msecs. Driving waveforms as illustrated in FIGS. 13(*b*) and 13(*c*) improve the erasing response characteristics with erasing times of about 425 msecs. Such erasing times, however, are far from practical.

The driving waveform scheme of FIG. 13(*d*) is illustrated in greater detail in FIG. 16 as discussed below. With high voltage pulse $V_{e1}$ and writing voltage $V_{ON}=10.5$ volts, holding voltage $V_h=1.5$ volts and time $t_{e1}=1$ msec, the driving waveform scheme of FIG. 13(*d*) results in the display of pixels on the individual scan lines disappearing within 80 msecs or less. No lines on the display appear to flash or otherwise appear erased. The time required for renewing (i.e. refreshing) the entire picture is approximately 400 msecs. No more than approximately one fifth of the overall display panel disappears from view at any one time which even during its disappearance is practically imperceptible. Just prior to any particular row of pixels having their contents rewritten, the line of pixels becomes gradually thinner and disappears as noted above, for approximately 80 msecs. The electro-optical device in accordance with the driving waveform scheme of FIG. 13(*d*) provides a high quality of display and avoids the flickering conditions associated with the batched erasing method in a conventional driving system.

The electro-optical device built in accordance with the seventh embodiment and with a value of $\Delta P$ ranging from $-0.2$ to $-0.3$ will have approximately the same erasing response time whether exhibiting abnormal or normal hysteresis characteristics.

An improvement in the erasing response characteristics using a liquid crystal panel exhibiting normal hysteresis characteristics can be obtained when the value of $\Delta P$ is $-0.2$ or more. Erasing period $t_{e2}$ requires only 64 msecs or 70 msecs using the driving waveform schemes of FIGS. 13(*d*) or 13(*e*), respectively. One sixth or less of the display content of the entire picture disappears at any instant in time.

Figure 16:
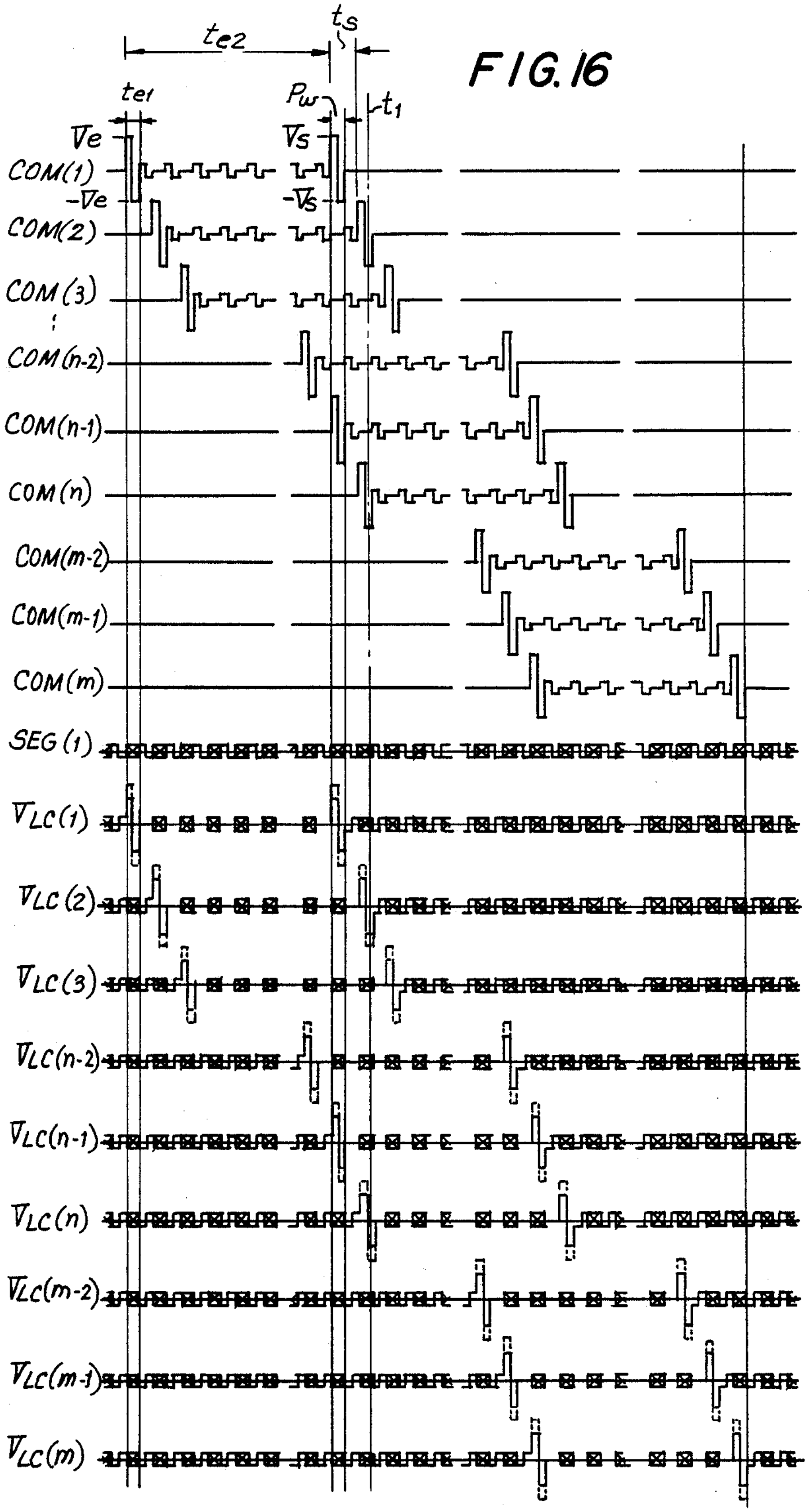
FIG. 16 is a timing diagram of driving waveforms in accordance with the seventh embodiment of the invention.

As shown in FIG. 16, COM (1)-COM (m) represent signal waveforms applied to the Scan Line (1) - Scan Line (m) of FIG. 18, respectively. SEG (1) is the data signal waveform applied to Data Line (1) of FIG. 18. $V_{LC}$(1)-$V_{LC}$(m) are the synthesized waveforms applied to the liquid crystal of pixels orthogonal to Data Line (1) and on Scan Line (1) - Scan Line (m), respectively.

The power source used with the electro-optical device has five or six different voltage levels including a voltage level $V_{e1}$ for high voltage pulses applied to the scan line at the beginning of erasing period $t_{e2}$ and having a time duration of $t_{e1}$. Other voltage levels of the power source include writing voltage $V_{ON}$ applied for writing period $P_w$, holding voltages $\pm V_h$ and voltage pulses of $\pm V_e$ applied to the scan lines and data lines during the erasing periods. The cycle, waveform and voltage level of the erasing signals, however, need not conform to the above requirements provided the effective value of the voltage during erasing period $t_{e2}$ is less than holding voltage $V_h$. For example, the effective value of the voltage during erasing time $t_{e2}$ can be at substantially zero volts. The pulse width $P_w$ and writing voltage $V_w$ may be set as shown in FIG. 4. Therefore, the value of high voltage pulses $V_{e1}$ can be set at any value and are not dependent on $V_s$ (i.e. $V_w$).

The erasing speed increases as the magnitude of the high voltage pulses of time duration $t_{e1}$ increases and will be explained in greater detail in connection with the eighth embodiment of the invention. Preferrably, for increasing the speed at which the contents of the pixels is erased, the high voltage pulses occurring during time $t_{e1}$ should be set at least equal to or higher than the magnitude of writing voltage $V_w$ (i.e. $V_s$). The speed at which the contents is erased is further increased by decreasing the effective value of the voltage level during the erasing period as much as possible.

Conventional driving systems are confined to employing liquid crystal panels exhibiting normal hysteresis characteristics in which the value of $\Delta P$ is 0.3–0.2. In contrast thereto, in accordance with the seventh embodiment of the invention the value of $\Delta P$ can be $-0.3$ without producing liquid crystal compositions having low twist angles. With $\Delta P$ at $-0.3$, the liquid crystal panel will exhibit abnormal hysteresis characteristics.

Assuming a constant cell gap of 6.0 micrometers, additional chiral dopant can be added to the liquid crystal composition which is poured into the liquid crystal panel increasing the wt% of chiral dopant by approximately 11%, that is, from a range of 0.79 wt% obtained by subtracting 1.11 wt% from 1.90 wt% to a range of 0.88 wt% range obtained by subtracting 1.02 wt% from 1.90 wt%. Inversely, where an amount of chiral dopant added to the liquid crystal composition is fixed at 1.69 wt% which is equivalent to $\Delta P=-0.1$ with the cell gap at 6.0 micrometers, the allowable width of the cell gap of the liquid crystal panel can be increased by about 20%. More particularly, the 20% increase is based on an increase from a 3.34 micrometers range obtained by subtracting 5.33 micrometers from 8.67 micrometers to a 4.00 micrometer range obtained by subtracting 4.67 micrometers from 8.67 micrometers. The margin for adding chiral dopant in the manufacturing of the liquid crystal panel can be increased. Consequently, the manufacturing yield of electrooptical devices increases.

In accordance with an eighth embodiment of the invention an electro-optical device includes a liquid crystal panel having a pixel array of 750×1120 dots. The orientation process results in a pre-tilt angle of liquid crystal molecules set at 25° by virtue of the slant deposition of SiO and has a twist angle of within the liquid crystal composition between the upper and lower substrates of 270°. The liquid crystal composition ZLI-3187 made by E. Merck has a chiral dopant of CB-15 made by BDH Corp.

The hysteresis characteristics of the liquid crystal panel in accordance with this eighth embodiment of the invention depends on such conditions as the interface regulating force, cell manufacturing factor, kind of chiral dopant, and the like. Liquid crystal composition ZLI-3187 with 2.43 to 2.17 wt% CB-15 as chiral dopant is poured into a liquid crystal panel having a cell gap of 4.4 micrometers. The value of $\Delta P$ is set between $-0.05$ to $-0.15$. The liquid crystal panel exhibits normal hysteresis characteristics. When chiral dopant CB-15 is 2.05 wt% or less and the value of $\Delta P$ is smaller than $-0.2$, a low twist angle (domain) frequently occurs although differences exist in the twist domain according to the type of liquid crystal panel used. No low twist domain is created in regions in which the value of $\Delta P$ is between 0.15 to $-0.2$. Abnormal hysteresis characteristics may or may not be exhibited depending on the manufacturing conditions of the liquid crystal panel.

Using the batch type conventional HTN driving method, the erasing time is 13 msecs. on a liquid crystal panel exhibiting normal hysteresis characteristics in which the value of $\Delta P$ is 0.1. Under such conditions, a zero voltage level is impressed on the entire liquid crystal panel during erasing period $t_{e2}$ (as shown in FIG. 13(*a*)) while operating at a temperature of 30° C. With the liquid crystal panel exhibiting abnormal hysteresis characteristics in which the value $\Delta P$ is $-0.2$, erasing $t_{e2}$ requires several hundred milliseconds at best and as much as several seconds under the slowest erasing response conditions.

As illustrated in FIGS. 13(*d*) or 13(*e*) it is possible to substantially reduce erasing period $t_{e2}$ by providing high voltage pulses at the beginning of erasing period $t_{e2}$ for a duration of time $t_{e1}$ and thereafter impressing on the scan lines alternately a zero voltage level and inversion pulses of level $\pm V_h$. By using the driving waveform scheme of FIGS. 13(*d*) or 13(*e*) the length of the erasing periods for liquid crystal panels exhibiting abnormal hysteresis can be substantially equalized to the erasing period of liquid crystal panels exhibiting normal hysteresis characteristics in accordance with the driving waveform scheme of FIG. 13(*a*).

As shown in Table 1, when applying the driving waveform scheme of FIGS. 13(*d*) or 13(*e*), erasing times $t_{e2}$ will vary based on inversion pulses having magnitudes of ±2.11 volts, high voltage pulses $V_{e1}$ varying between 10–50 volts during time $t_{e2}$ and time $t_{e1}$ varying between 0.2–5.0 millisecond.

TABLE 1

| Driving Waveforms of FIG. 13 | $t_{e1}$ (ms) | $V_{e1}$ (volts) 10 | 20 | 30 | 40 | 50 |
|---|---|---|---|---|---|---|
| (d) | 5.0 | 27.7 | 27.0 | 26.7 | 26.5 | 26.4 |
| | 1.0 | 26.3 | 25.4 | 24.6 | 24.5 | 24.4 |
| | 0.5 | 26.0 | 24.6 | 24.5 | 24.3 | 23.8 |
| | 0.2 | 25.4 | 24.2 | 23.8 | 23.5 | 23.4 |
| (e) | 5.0 | 31.5 | 31.2 | 31.0 | 30.9 | 30.6 |
| | 1.0 | 26.5 | 24.9 | 24.7 | 24.5 | 24.3 |
| | 0.5 | 25.3 | 24.9 | 24.3 | 23.6 | 23.6 |
| | 0.2 | 24.9 | 24.7 | 23.8 | 23.8 | 23.4 |

As demonstrated by Table 1, the larger the magnitude of high voltage pulse $V_{e1}$, the less total erasing time is required. For example, for driving waveforms of FIG. 13(*d*) with time $t_{e1}$ of 5.0 milliseconds, erasing period $t_{e2}$ decreases from 27.7 milliseconds to 26.4 milliseconds as high voltage pulse $V_{e1}$ increases from 10 volts to 50 volts, respectively. Furthermore, by decreasing the length of time that high voltage pulse $V_{e1}$ is applied, the less time is required to erase the contents of the pixels. For example, when the driving waveforms of FIG. 13(*e*) have a high voltage pulse $V_{e1}$ of 10 volts and time t decreases from 5.0 milliseconds to 0.2 milliseconds, erasing period $t_{e2}$ is reduced from 31.5 milliseconds to 24.9 milliseconds, respectively.

Table 1 also shows that the effective erasing period ($t_{e2}$–$t_{e1}$) decreases (i.e. the erasing speed increases) in proportion to the length of time that the erasing high voltage pulse is applied. For example, for driving waveforms of FIG. 13(*d*) when $V_{e1}=10$ volts and erasing period $t_{e1}=5$ milliseconds, the effective erasing period is 22.7 milliseconds (i.e. 27.7–5.0) whereas when $V_{31}=10$ volts and erasing period $t_{e1}$ is 0.2 milliseconds, the effective erasing period is 25.2 milliseconds (i.e. 25.4–0.2).

Under the eight embodiment of the invention the liquid crystal panel was multiplex driven at a temperature of 30° C. with the effective voltage during erasing period $t_{e2}$ equal to holding voltage $V_h$. Writing voltage $V_{ON}=15.0$ volts, holding voltage $V_h=2.11$ volts, selecting type $t_s=0.5$ milliseconds, high voltage pulse $V_e=20.0$ volts and time $t_{e1}=0.5$ milliseconds. Based on the waveform scheme of FIG. 13(*b*) the display contents of pixels associated with the last scan line to be selected disappeared for approximately 365 milliseconds. In accordance with the invention, however, based on the driving waveform scheme of FIG. 13(*d*) each row of pixels is without data for no more than 25 milliseconds regardless of the position of the pixel row on the screen.

Erasing response characteristics typically deteriorate at lower temperatures. Nevertheless, even at an operating temperature 10° C. the driving method of the invention provides that the scan line last selected in any particular frame will be without data for about 80 milliseconds which is more than acceptable for practical use.

Liquid crystal panels using conventional driving waveforms which exhibit normal hysterises characteristics require the value of ΔP to fall between 0.05 and −0.15. In accordance with the eighth embodiment of the invention, however, ΔP can be at −0.2 resulting in a liquid crystal panel exhibiting abnormal hysterisis characteristics but without creating the low twist domain. Assuming a constant cell gap of 4.4 micrometers, the addition of chiral dopant added to the liquid crystal composition increases its %wt by approximately 46%. This increase is based on an increase from a 0.26 wt% obtained by subtracting 2.17 wt% from 2.43 wt% to a 0.38 wt% range obtained by subtracting 2.05 wt% from 2.43 wt.%.

If the amount chiral dopant added to the liquid crystal composition is fixed at 2.30 wt% with the ΔP set at −0.1 and the cell gap at 4.4. micrometers, the width of the cell gap of the liquid crystal panel can be increased by as much as about 52%. This increase is based on an increase from a 0.48 micrometer range determined by subtracting 4.16 micrometers from 4.64 micrometers to a 0.73 micrometer range obtained by subtracting 3.91 micrometers from 4.64 micrometers. As a result, the liquid crystal panel can be manufactured with a greater range of cell gap widths providing a higher manufacturing yield of liquid crystal panels.

The improved erasing response characteristics associated with the application of high voltage pulses during the erasing period in connection with the seventh and eighth embodiments of the invention is not contingent on such factors as the liquid crystal composition and panel structure (e.g. twist angle and pre-tilt angle). Liquid crystal compositions include, but are not limited to, ZLI-1840, ZLI-3238, ZLI-3239, ZLI-2411, ZLI-3219, ZLI-18OO/000, ZLI-3201/000 and ZLI-1691. The same advantageous effects associated with the invention are produced no matter which of these liquid crystal compositions are used. Each of these liquid crystal compositions have a small gap margin providing particular effectiveness. The invention can be used in liquid crystal panels which have super twisted regions of more than 180° (i.e., twist angles of 270°, 285°, 300°, 330° and 360°) and which exhibit the aforementioned hysteresis characteristics.

The invention is also effective with liquid crystal panels operating in a nematic cholesteric phase transition mode or in a mode where a substantially zero voltage level is impressed so as to revert to an initial state of the nematic phase or of the cholesteric phase. As compared to a convention of driving method, the invention also provides the capability of reducing the time during which the contents of a row of pixels is not displayed by as much as a factor of three when the display unit has approximately 1,000 scan lines.

As now can be readily appreciated, the invention requires the effective voltage during the erasing period to be at a level other than zero volts in order to substantially equalize the period of time during which any row of pixels is without data. Writing voltage $V_w$ and its pulse width $P_w$ are not dependent upon any of the embodiments of the invention.

The normal and abnormal hysteresis characteristics or the region of ΔP in which the low twist domain is reduced differ depending on the requirements of orientation (e.g. pre-tilt angle of the liquid crystal panel), orientation materials, manufacturing conditions associated with the twist angle, distribution of materials between the gap, liquid crystal composition and chiral dopant materials. Accordingly, the invention is not limited to the different embodiments described herein.

The relationship between the amounts of chiral dopant relative to the liquid crystal composition and the helical twisting power differs according to the liquid crystal composition employed. Therefore, the quantity of chiral dopants and associated and cell gap values are not limited to the values disclosed herein.

The invention is not confined to liquid crystal panels exhibiting the HTN mode of operation and can be used in all liquid crystal display units in which the contents of the pixels after being written therein are to be maintained for some temporary period of time. For example, a liquid crystal display unit such as a nematic-cholesteric phase transition type in which the write content is held by a holding voltage after the erasing/writing process occurs can employ the method of driving in accordance with the invention.

In accordance with the invention, a bistable electrooptical device will erase data from each row of pixel for substantially the same period of time thereby preventing a flickering effect on the screen. More particularly, the variation in length of time that the data is displayed and erased depending on which portion of the screen is being viewed are minimized. Still further, liquid crystal panels exhibiting abnormal hysteresis characteristics (i.e., relatively long erasing times) can use the method of the invention to reduce the times during which pixels associated with scan lines selected near the end of each frame are without data. The invention therefore improves the display quality of the write content holding type liquid crystal display unit associated with a nematic-cholesteric phase transition mode or the HTN mode.

Theoretically, the number of scan lines can be increased without limit since there is no dependency on duty ratio. Electrooptical devices employing the invention advantageously have greater tolerances with respect to cell gaps resulting in a higher manufacturing yield of liquid crystal panels.

The invention can be extended to the application of display units having hyperresolving power which are suited to personal computers, terminal equipment and measuring instruments.

It will thus be seen that the objects set forth above, among those made apparent from the preceding description, are efficiently attained and since certain changes may be made in carrying out the above method without departing from the spirit and scope of the invention, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language, might be set to fall therebetween.

What is claimed is:

1. A method of driving an electro-optical device having a plurality of scan lines, data lines and pixels, comprising:

providing data on at least one of said data lines;

storing data in at least one of said pixels during a writing period by providing at least one scan line with a writing signal;

maintaining said data within said at least one pixel during a holding period by providing a holding signal on said at least one scan line; and erasing data stored in each pixel by providing each scan line and data line with an erasing signal during an erasing period, wherein the erasing period for each scan line occurs over substantially the same length of time after the completion of one holding period and before the beginning of the next writing period.

2. The method of claim 1, wherein for each scan line the effective voltage level of the erasing signal is less than the voltage level of the holding signal.

3. The method of claim 2, wherein the writing signal provided to each scan line occurs at a different point in time.

4. The method of claim 3, wherein the holding period occurs following the writing period.

5. The method of claim 4, wherein the erasing period of each scan line is begun at a different point in time.

6. The method of claim 5, wherein each writing signal includes a selecting pulse having a predetermined width and wherein for each scan line, the initiation of each erasing period is delayed in time by more than the width of selecting pulse provided during the previous writing period.

7. The method of claim 5, wherein the effective voltage level of the erasing signal is less than $(2/3)^{\frac{1}{2}}$ times the maximum absolute value of the holding signal.

8. The method of claim 5, wherein the holding signal provided on each scan line includes a plurality of voltage pulses encompassing a period of time greater than one fourth the writing period.

9. The method of claim 5, wherein the erasing signal includes at least one voltage pulse having a peak value greater than the maximum absolute value of the holding signal.

10. The method of claim 9, wherein said at least one voltage pulse of the erasing signal occurs at the beginning of the erasing period.

11. The method of claim 10, wherein said at least one voltage pulse has a peak value at least equal to the maximum absolute value of the writing signal.

12. The method of claim 11, wherein the erasing signal further includes additional pulses.

13. The method of claim 12, wherein said additional pulses have maximum absolute values equal to the maximum absolute value of the holding signal.

14. The method of claim 12, wherein said additional pulses have maximum absolute values less than the maximum absolute value of the holding signal.

15. The method of claim 5, wherein the erasing signal includes at least one pulse having a peak value at least equal to the maximum absolute value of the writing signal.

16. The method of claim 15, wherein said at least one pulse occurs at the beginning of the erasing period.

17. The method of claim 2, wherein the holding period occurs following the writing period.

18. The method of claim 2, where the erasing period of each scan line is begun at a different point in time.

19. The method of claim 2, wherein each writing signal includes a selecting pulse having a predetermined width and wherein for each scan line, the initiation of each erasing period is delayed in time by more than the width of the selecting pulse provided during the previous writing period.

20. The method of claim 2, wherein the effective voltage level of the erasing signal is less than $(2/3)^{\frac{1}{2}}$ times the maximum absolute value of the holding signal.

21. The method of claim 2, wherein the holding signal provided on each scan line includes a plurality of voltage pulses encompassing a period of time greater than one fourth the writing period.

22. The method of claim 2, wherein the erasing signal includes at least one voltage pulse having a peak value greater than the maximum absolute value of the holding signal. For example, for driving waveforms of FIG. 13(*d*) when $V_{e1}$ 10 volts 23. The method of claim 22, wherein said at least one voltage pulse of the erasing signal occurs at the beginning of the erasing period.

24. The method of claim 22, wherein said at least one voltage pulse has a peak value at least equal to the maximum absolute value of the writing signal.

25. The method of claim 2, wherein the erasing signal includes at least one pulse having a peak value at least equal to the maximum absolute value of the writing signal.

26. The method of claim 2, wherein said at least one pulse occurs at the beginning of the erasing period.

27. The method of claim 1, wherein the writing signal provided to each scan line occurs at a different point in time.

28. The method of claim 1, wherein the holding period occurs following the writing period.

29. The method of claim 1, wherein the erasing period of each scan line is begun at a different point in time.

30. The method of claim 1, wherein each writing signal includes a selecting pulse having a predetermined width and wherein for each scan line, the initiation of each erasing period is delayed in time by more than the width of the selecting pulse provided during the previous writing period.

31. The method of claim 30, wherein the effective voltage level of the erasing signal is less than $(2/3)^{\frac{1}{2}}$ times the maximum absolute value of the holding signal.

32. The method of claim 31, wherein the erasing signal includes at least one voltage pulse having a peak value greater than the maximum absolute value of the holding signal.

33. The method of claim 32, wherein said at least one voltage pulse of the erasing signal occurs at the beginning of the erasing period.

34. The method of claim 1, wherein the effective voltage level of the erasing signal is less than $(2/3)^{\frac{1}{2}}$ times the maximum absolute value of the holding signal.

35. The method of claim 34, wherein the holding signal provided on each scan line includes a plurality of voltage pulses encompassing a period of time greater than one fourth the writing period.

36. The method of claim 1, wherein the holding signal provided on each scan line includes a plurality of voltage pulses encompassing a period of time greater than one fourth the writing period.

37. The method of claim 1, wherein the erasing signal includes at least one voltage pulse having a peak value greater than the maximum absolute value of the holding signal.

38. The method of claim 37, wherein said at least one voltage pulse of the erasing signal occurs at the beginning of the erasing period.

39. The method of claim 37, wherein said at least one voltage pulse has a peak value at least equal to the maximum absolute value of the writing signal.

40. The method of claim 39, wherein said at least one voltage pulse occurs at the beginning of the erasing period.

41. The method of claim 1, wherein the erasing signal includes at least one pulse having a peak value at least equal to the maximum absolute value of the writing signal.

42. The method of claim 41, wherein said at least one pulse occurs at the beginning of the erasing period.

43. The method of claim 1, wherein the erasing signal includes a plurality of pulses.

44. The method of claim 43, wherein at least some of the plurality of pulses have a maximum absolute value equal to the maximum absolute value of the holding signal.

45. The method of claim 44, wherein said at least some of the plurality of pulses form an interrupted train of pulses.

46. The method of claim 45, wherein at least one additional pulse of the erasing signal has a maximum absolute value greater than said at least some of the plurality of pulses.

47. The method of claim 46, wherein said at least one additional pulse occurs at the beginning of the erasing period.

48. The method of claim 47, wherein said at least one additional pulse has a maximum absolute value at least equal to the maximum absolute value of the writing signal.

49. The method of claim 43, wherein at least some of the plurality of pulses have a maximum absolute value less than the maximum absolute value of the holding signal.

50. The method of claim 49, wherein said at least some of the plurality of pulses form an interrupted train of pulses.

51. The method of claim 50, wherein at least one additional pulse of the erasing signal has a maximum absolute value greater than said at least some of the plurality of pulses.

52. The method of claim 51, wherein said at least one additional pulse has a maximum absolute value greater than said at least some of the plurality of pulses.

53. The method of claim 52, wherein said at least one additional pulse has a maximum absolute value at least equal to the maximum absolute value of the writing signal.

54. The method of claim 1, wherein the effective voltage level of the erasing signal is less than $(\frac{1}{2})^{\frac{1}{2}}$ times the maximum absolute value of the holding signal.

55. The method of claim 1, wherein the effective voltage level of the erasing signal is less than $(\frac{1}{4})^{\frac{1}{2}}$ times the maximum absolute value of the holding signal.

56. The method of claim 1, wherein the electro-optical device includes a liquid crystal panel.

57. The method of claim 56, wherein the electro-optical device includes a hysteresis-type super-twisted nematic mode of operation and wherein the absolute value of the holding signal is based on a hysteresis loop of the voltage transmissivity characteristics of the device.

58. The method of claim 1, wherein the holding period for each scan line occurs over substantially the same period of time.

59. The method of claim 1, wherein the initiation of the holding period from one scan line to the next selected scan line is delayed by a fixed length of time.

* * * * *